United States Patent [19]

Wilson

[11] Patent Number: 5,237,960
[45] Date of Patent: * Aug. 24, 1993

[54] COLLAPSIBLE PORTABLE CORRAL HAVING AN ALLEY WAY WITH A HEAD GATE

[75] Inventor: Robert L. Wilson, Cherokee, Okla.

[73] Assignee: Wilson Mfg., Inc., Cherokee, Okla.

[*] Notice: The portion of the term of this patent subsequent to Oct. 2, 2007 has been disclaimed.

[21] Appl. No.: 720,954

[22] Filed: Jun. 25, 1991

Related U.S. Application Data

[63] Continuation-in-part of Ser. No. 558,758, Jul. 27, 1990, Pat. No. 5,115,763, which is a continuation of Ser. No. 364,700, Jun. 12, 1989, Pat. No. 4,960,074.

[30] Foreign Application Priority Data

| | | | |
|---|---|---|---|
| Jun. 8, 1990 | [VE] | Venezuela | 845/90 |
| Jun. 11, 1990 | [BR] | Brazil | PI9002736 |
| Jun. 11, 1990 | [CA] | Canada | 2018731 |
| Jun. 11, 1990 | [CO] | Colombia | 323816 |
| Jun. 12, 1990 | [AR] | Argentina | 317078 |
| Jun. 12, 1990 | [EP] | European Pat. Off. | 90630119.7 |
| Jun. 12, 1990 | [NZ] | New Zealand | 234029 |
| Jun. 12, 1991 | [AU] | Australia | 57018/90 |
| Jun. 12, 1991 | [MX] | Mexico | 21112 |

[51] Int. Cl.$^5$ ............................................. A01K 3/00
[52] U.S. Cl. .................................. 119/20; 119/848; 119/849
[58] Field of Search ......................... 119/20, 82

[56] References Cited

U.S. PATENT DOCUMENTS

| | | | |
|---|---|---|---|
| 2,263,069 | 11/1991 | Coyner | 119/20 |
| 3,002,493 | 10/1961 | Galamba | 119/20 |
| 3,520,516 | 7/1970 | Webster | 119/20 |
| 3,545,407 | 12/1970 | Moore | 119/20 |
| 3,970,045 | 7/1976 | Graham, Jr. | 119/20 |
| 4,252,082 | 2/1981 | Herring | 119/20 |
| 4,535,723 | 8/1985 | Gealy | 119/20 |
| 4,619,223 | 10/1986 | Koehn | 119/20 |
| 4,630,570 | 12/1986 | Wilson et al. | 119/20 |
| 4,829,936 | 5/1989 | Mollhagen | 119/20 |
| 4,924,813 | 5/1990 | Bixler et al. | 119/20 |
| 4,960,074 | 10/1990 | Wilson | 119/20 |

Primary Examiner—Paul J. Hirsch
Attorney, Agent, or Firm—John W. Carpenter

[57] ABSTRACT

A collapsible portable corral for confining and the movement of livestock and the like. The corral has a front chute for providing an exit and entrance for livestock. A first and second front section are pivotally secured to the front chute. An alley-way is pivotally secured to the first front section and a first and second intermediate section is respectively pivotally secured to the first and front section. A first and second rear section is respectively pivotally secured to the first and second interemediate section. Each of the first and second front sections is provided with a lever apparatus which is capable of raising or elevating a contiguous intermediate section relative to a front section and for holding the intermediate section in an elevated posture relative to the front section. Furthermore, each of the first and second intermediate sections has a similar lever device for elevating a contiguous rear section relative to the intermediate section and for holding the contiguous rear section in an elevated posture relative to the intermediate section. A method for confining and directing the movement of livestock which comprises providing a front chute to furnish an exit and entrance for the livestock, securing pivotally a first and second front section to the front chute, securing pivotally, subsequently a first and second intermediate section to the first and second front section respectively, confining livestock within the first and second sections and within the first and second intermediate sections, and directing the movement of livestock through the front chute.

4 Claims, 18 Drawing Sheets

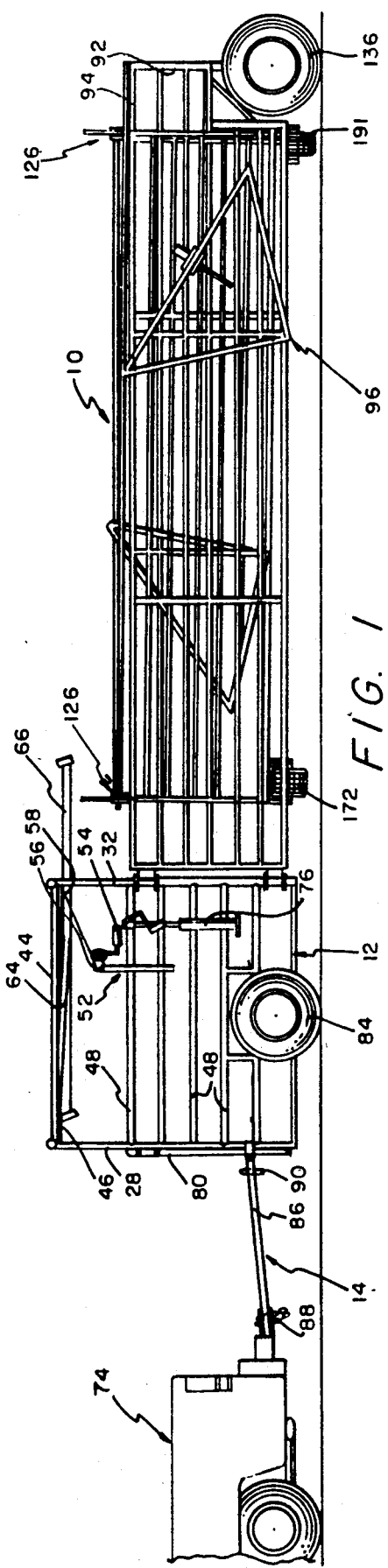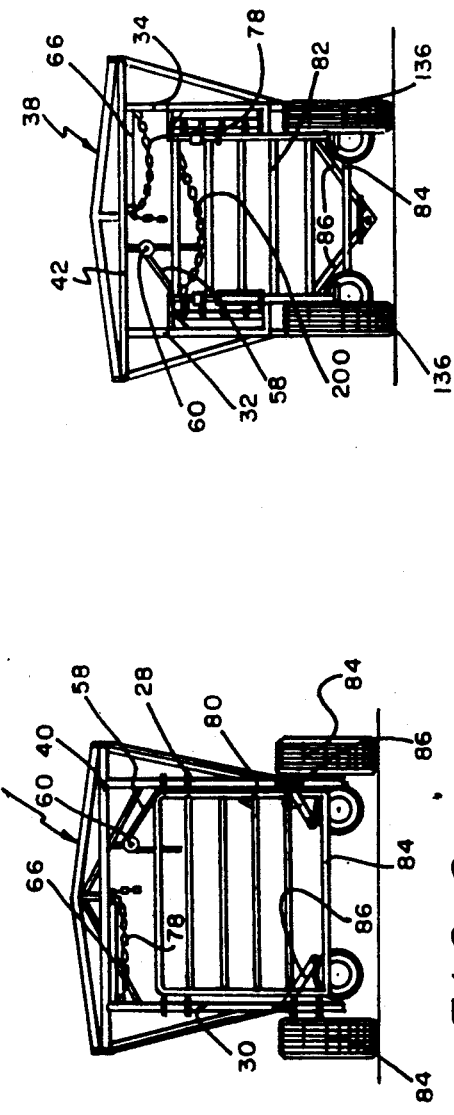

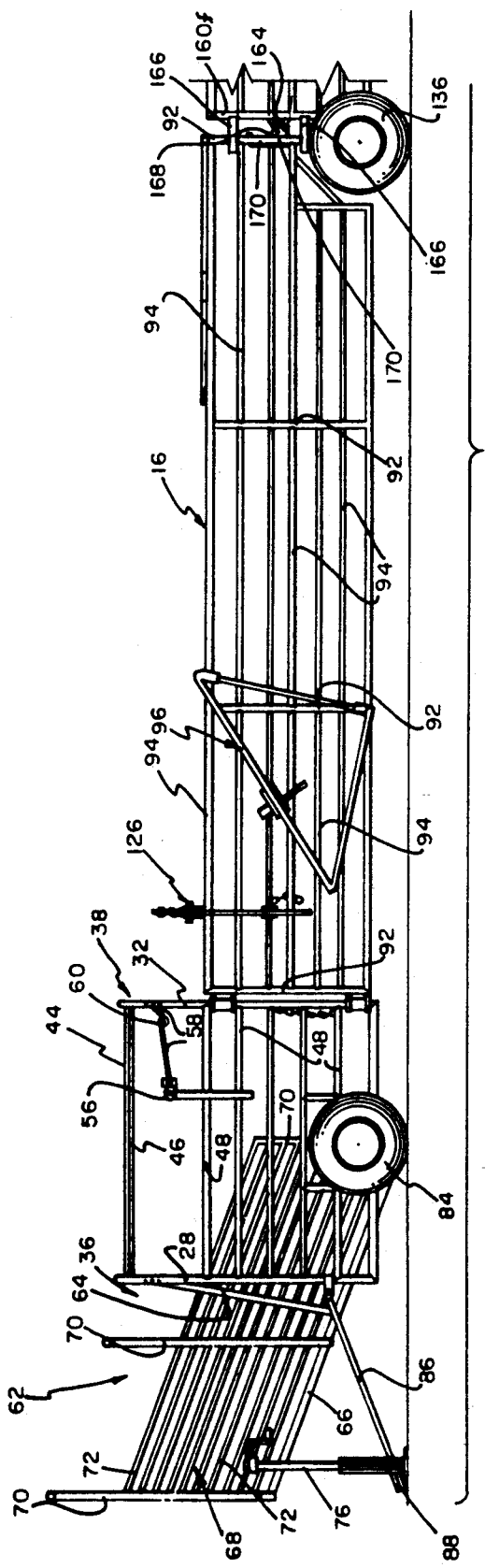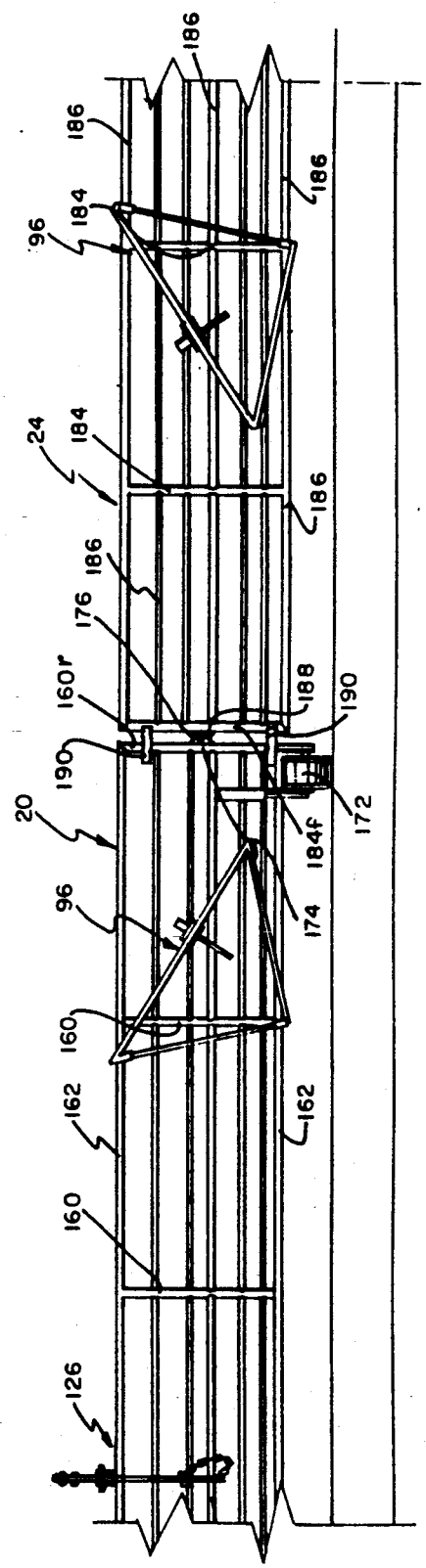

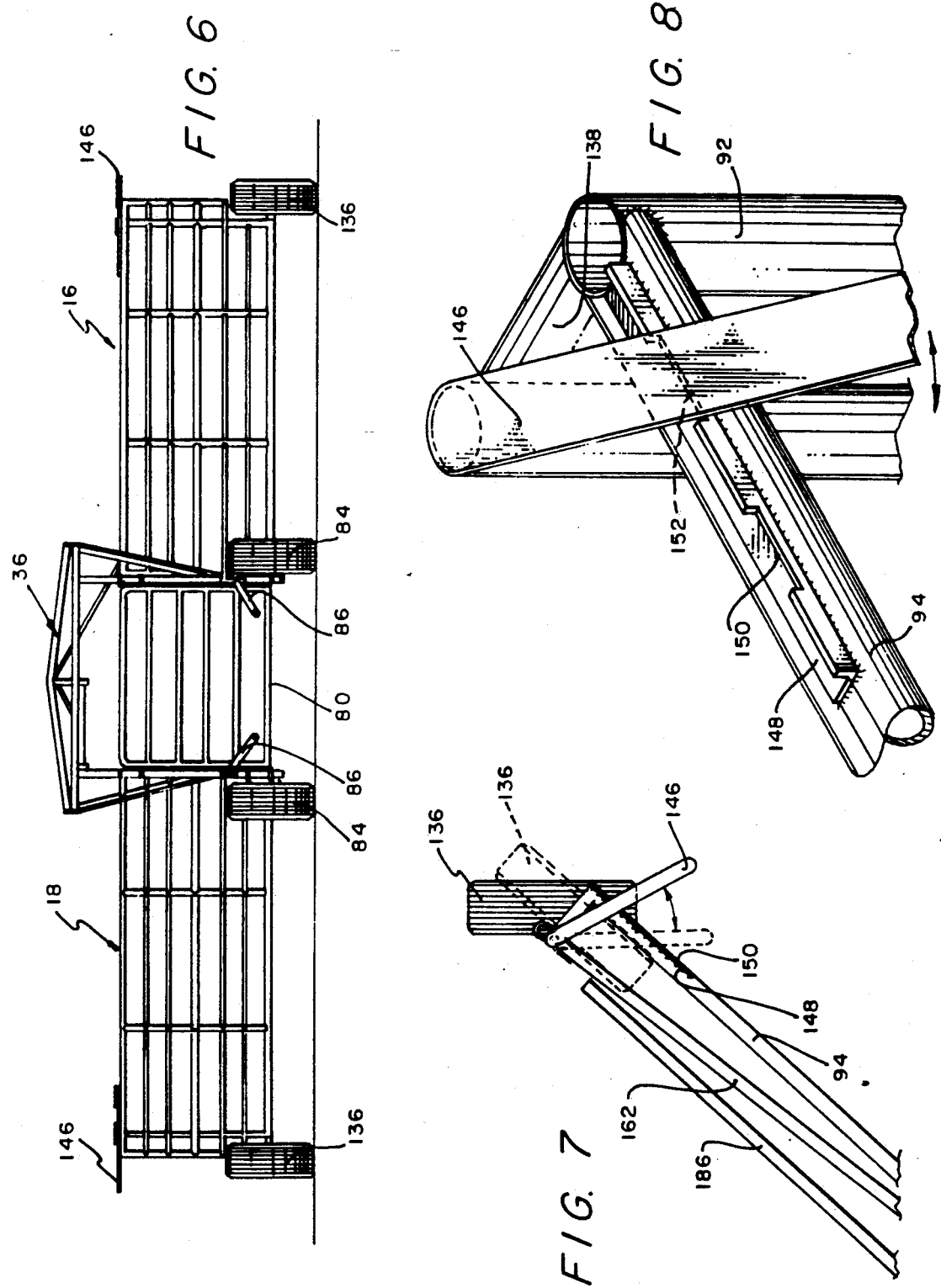

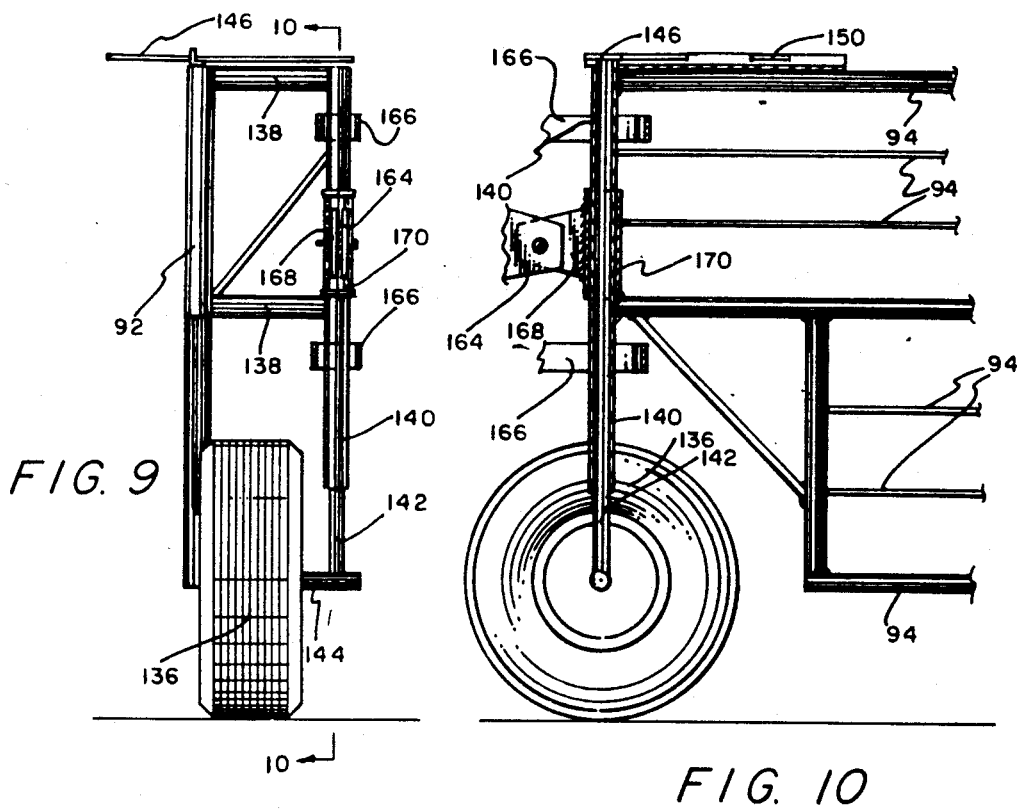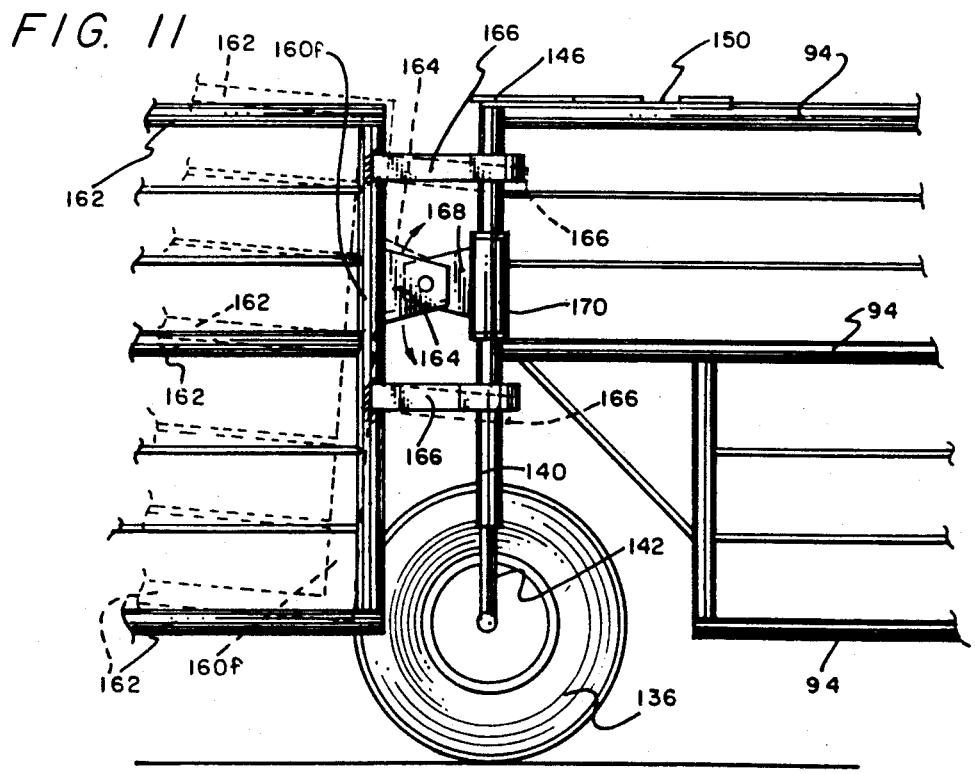

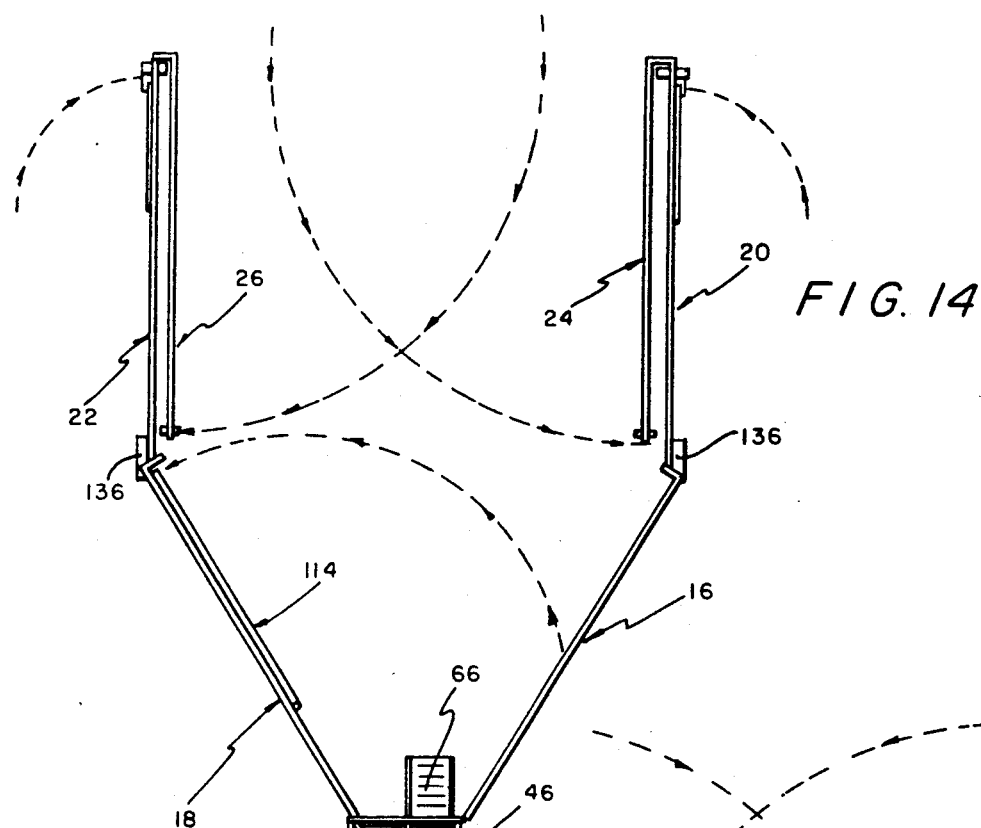
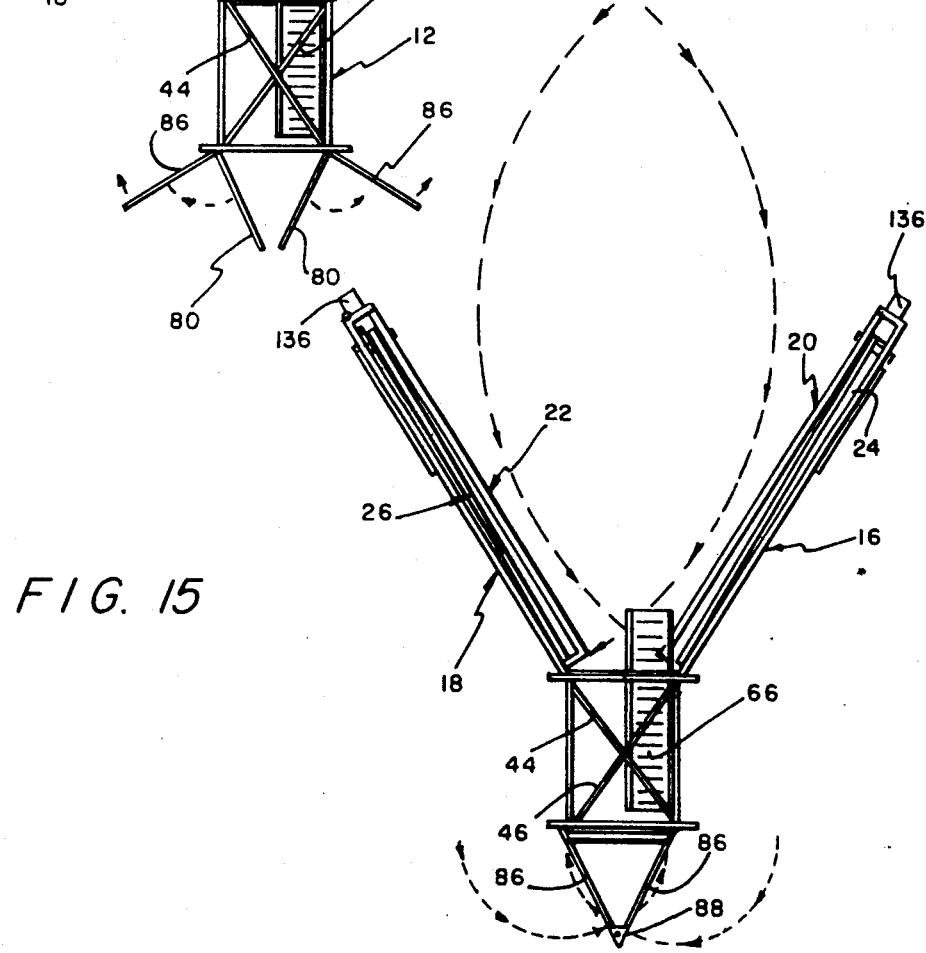
FIG. 14
FIG. 15

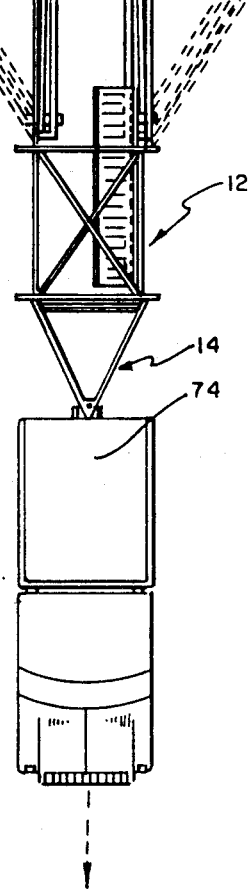
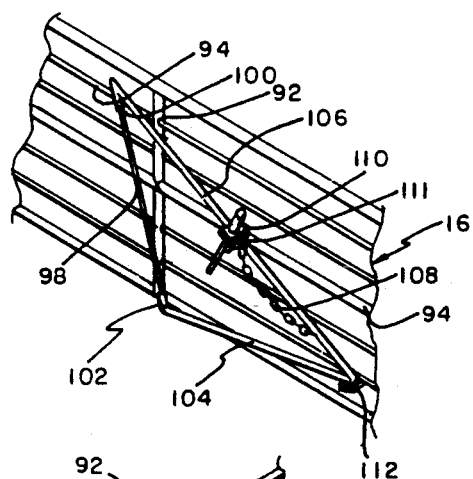
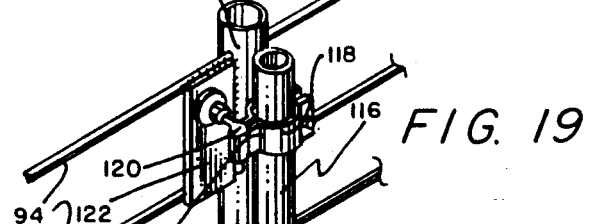
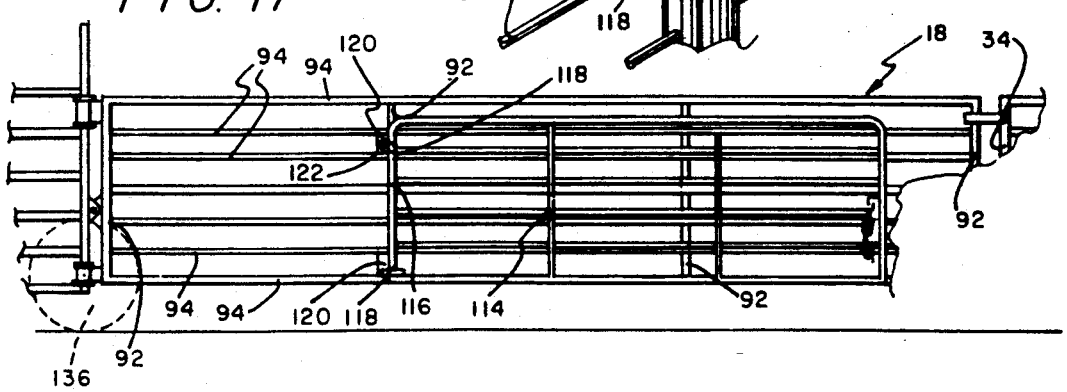

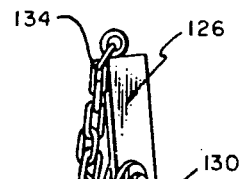
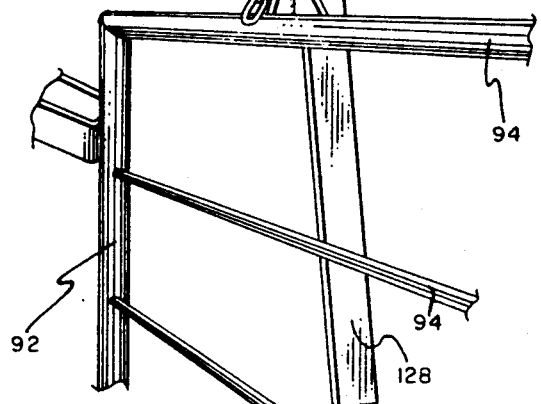
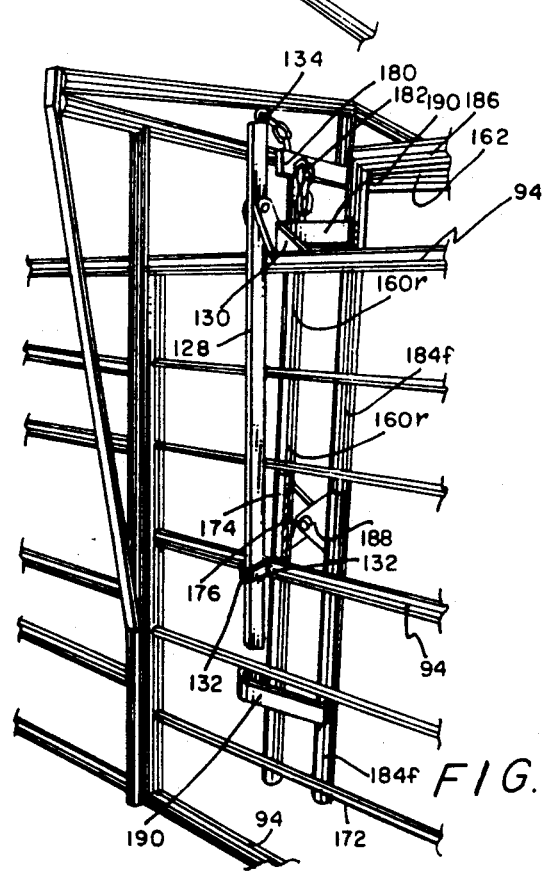
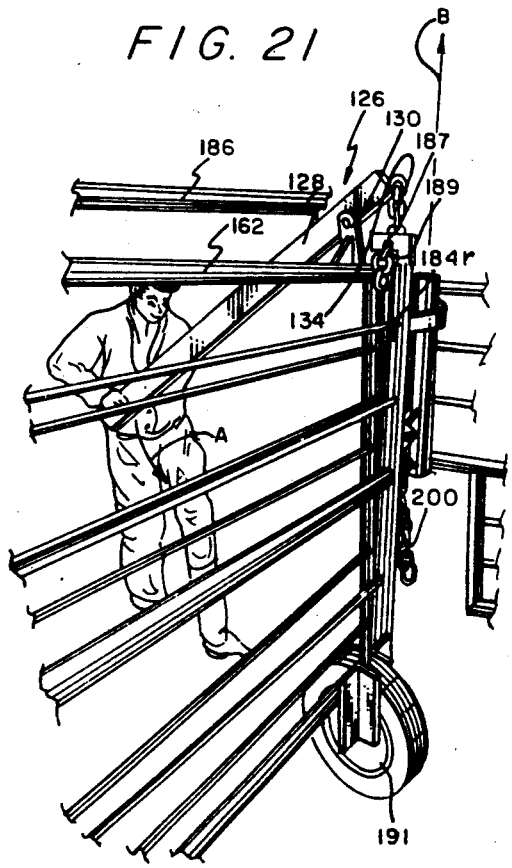
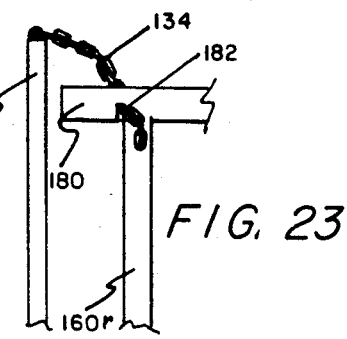

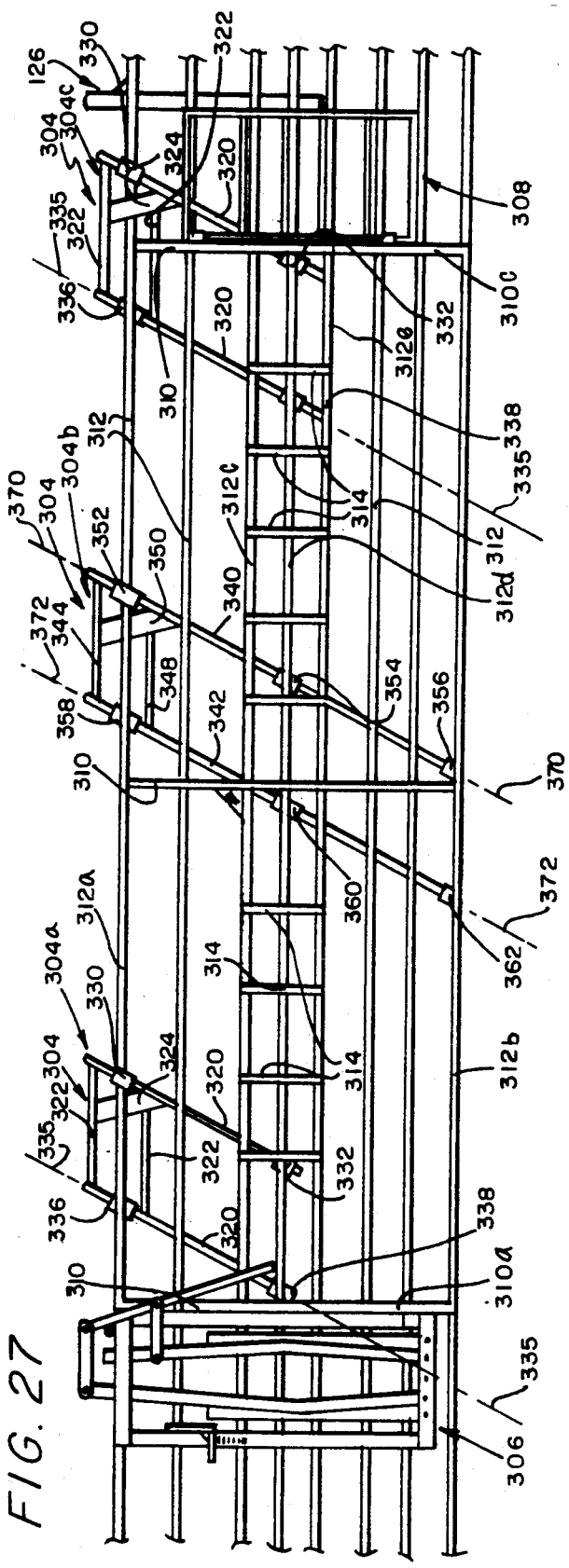
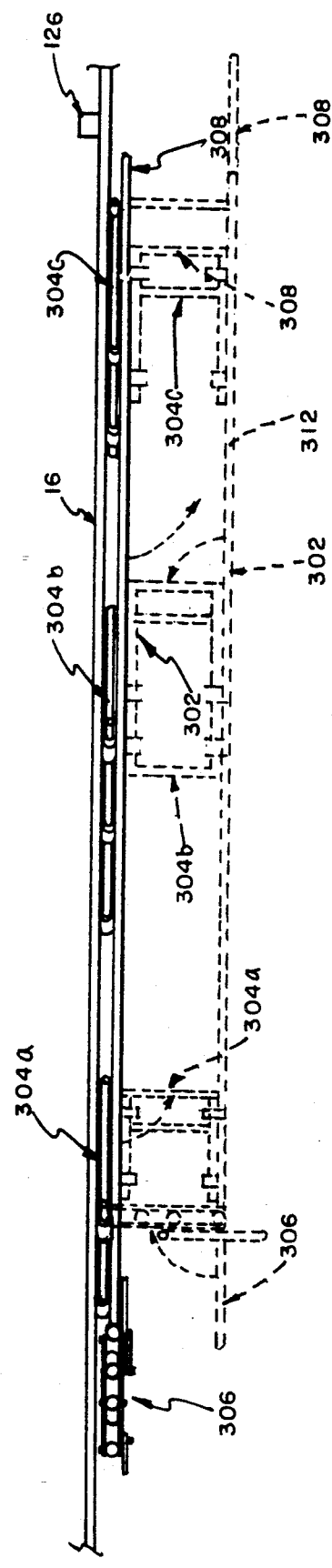
FIG. 27
FIG. 28

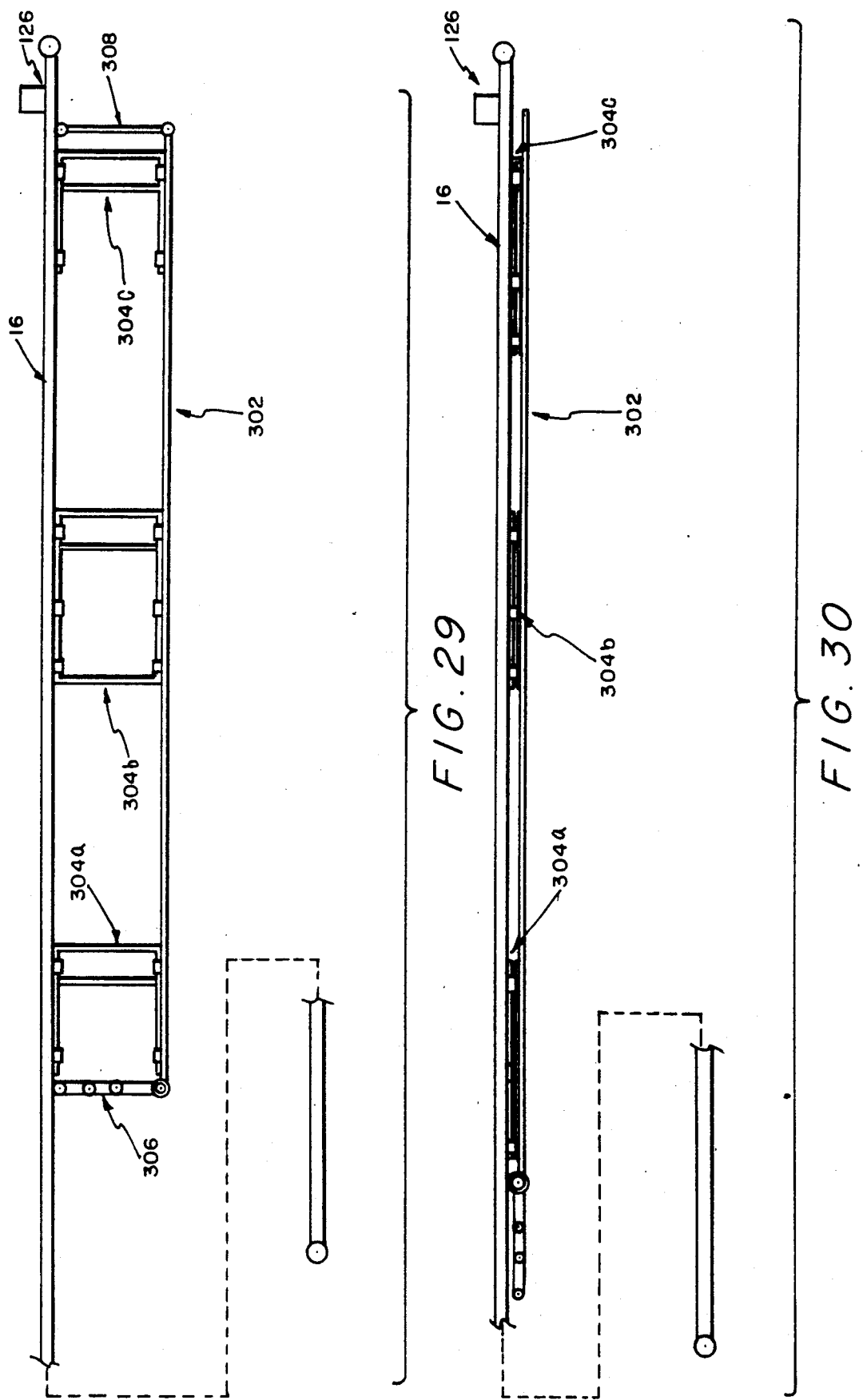

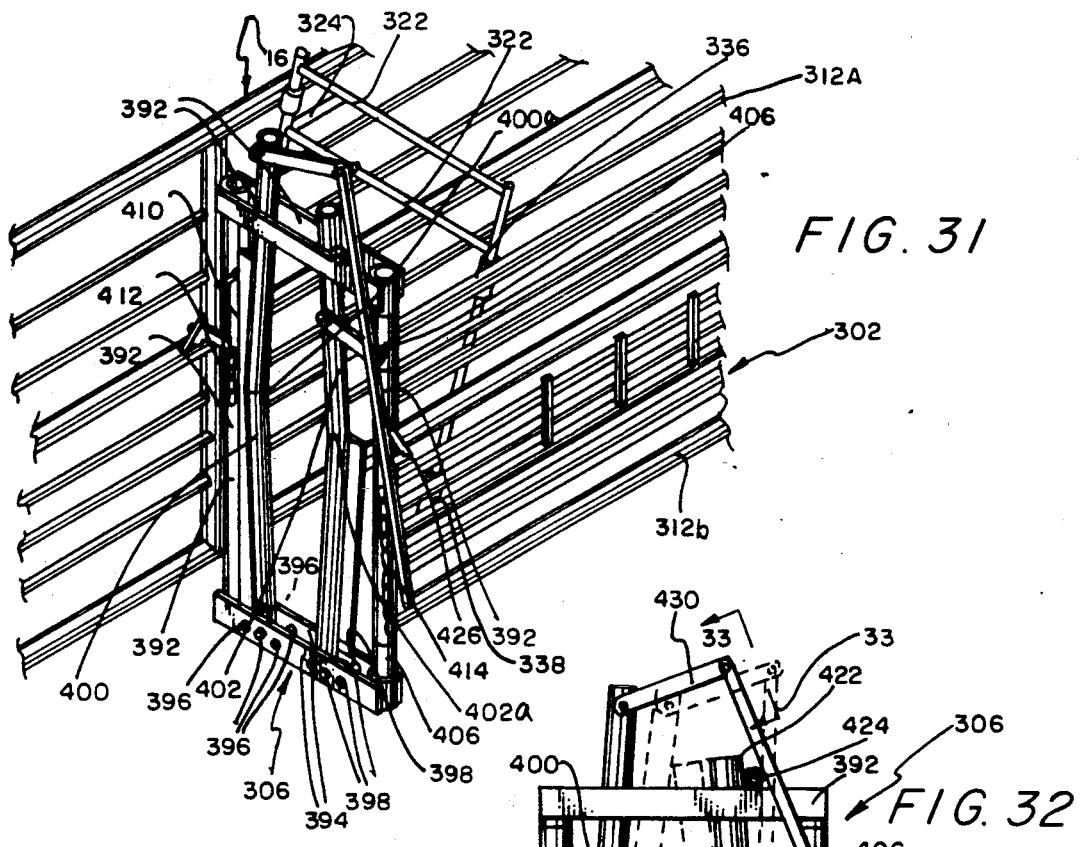
FIG. 31
FIG. 32
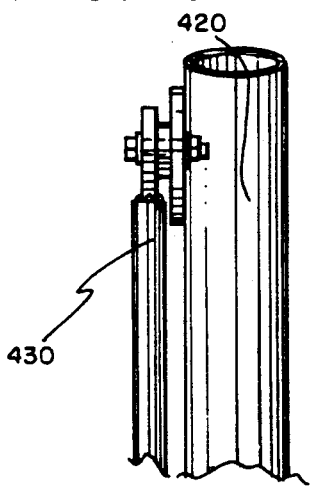
FIG. 33
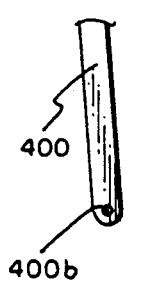
FIG. 32A
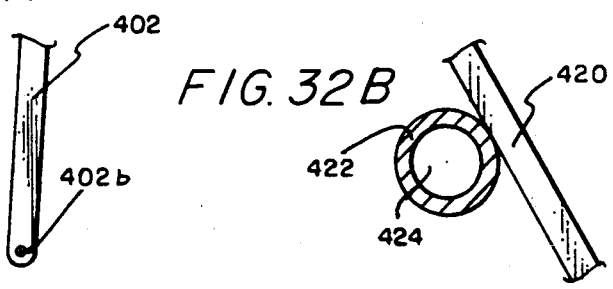
FIG. 32B

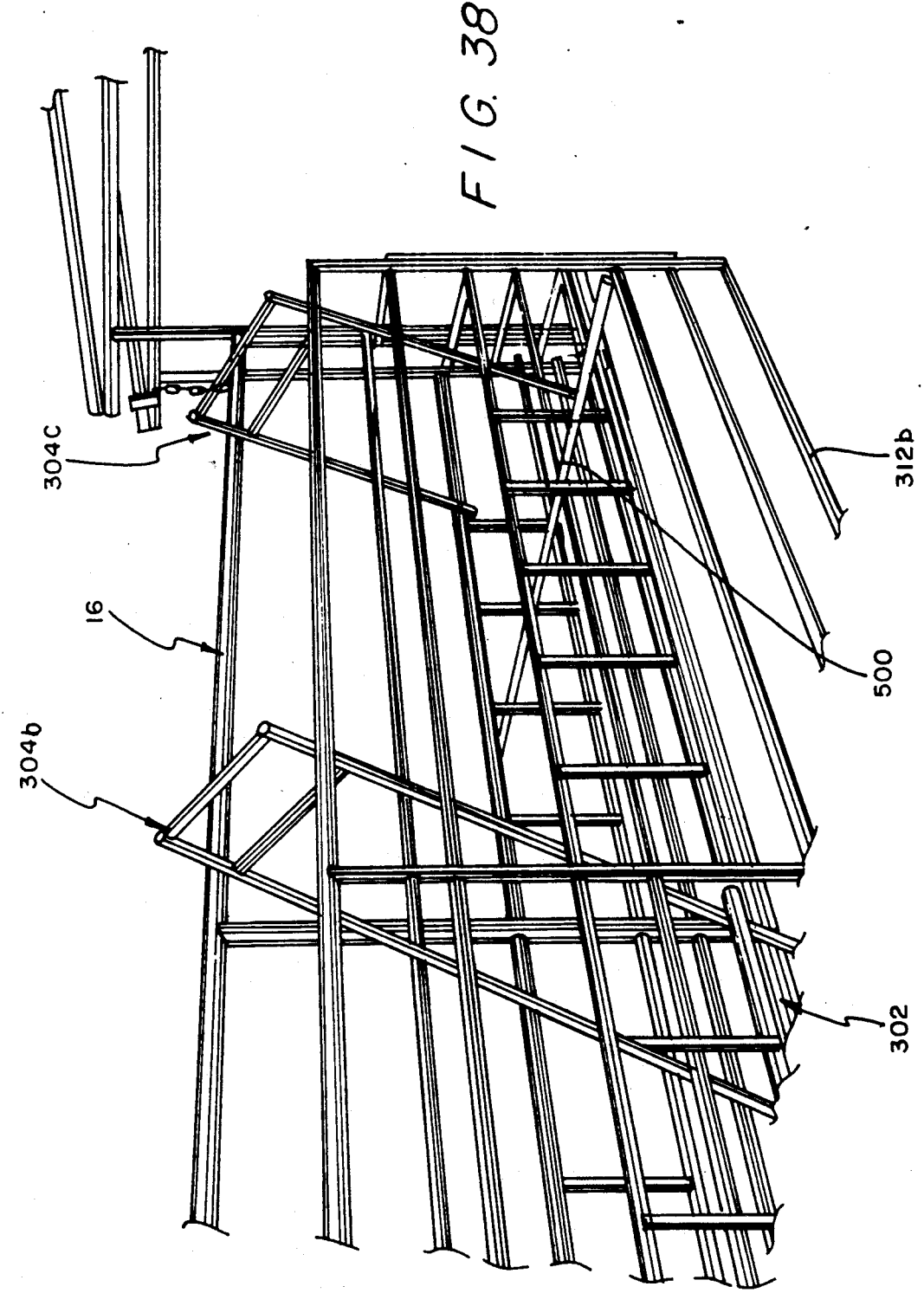

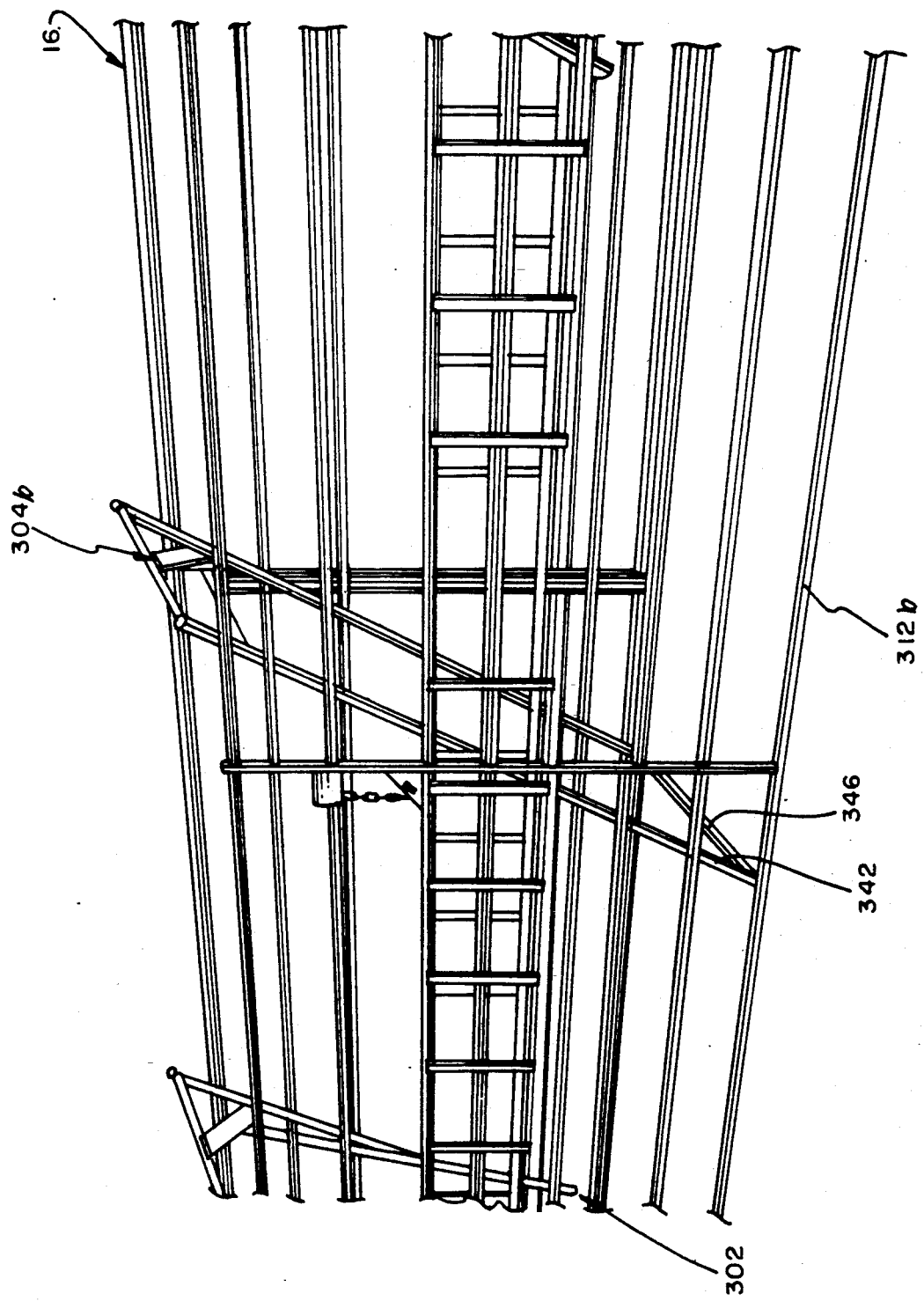

COLLAPSIBLE PORTABLE CORRAL HAVING AN ALLEY WAY WITH A HEAD GATE

This is a continuation-in-part application of copending application No. 07/558,758, filed Jul. 27, 1990 now U.S. Pat. No. 5,115,763. Copending application No. 07/558,758, now U.S. Pat. No. 5,115,763, is a continuation application of application No. 07/364,700, filed Jun. 12, 1989, now U.S. Pat. No. 4,960,074, filed Oct. 2, 1990. Benefit of the earliest filing date of Jun. 12, 1989 is claimed with respect to common subject matter.

BACKGROUND OF THE INVENTION

1. Field of the Invention

This invention is related to an improved collapsible portable corral. More specifically, this invention provides an improved portable, foldable corral for confining and directing the movement of livestock and the like, and an improved method for confining and directing the movement of livestock and the like.

2. Description of the Prior Art

A patentability investigation was conducted and the following U.S. patents were discovered: U.S. Pat. No. 2,729,196 to Breitenbach; U.S. Pat. No. 3,741,529 to Blagg; U.S. Pat. No. 3,921,585 to Hall; U.S. Pat. No. 4,048,959 to Steele; U.S. Pat. No. 4,201,157 to Lambert; U.S. Pat. No. 4,250,836 to Smith; and U.S. Pat. No. 4,619,223 to Koehn. None of the foregoing prior art teach or suggest the particular improved collapsible portable corral and improved method for confining and directing the movement of livestock of this invention.

SUMMARY OF THE INVENTION

The present invention accomplishes its desired objects by broadly providing a portable, foldable corral for confining and directing the movement of livestock and the like. The corral comprises a front chute means which defines an exit and entrance for livestock and the like. A first front section is pivotally secured to the front chute means. Similarly, a second front section is pivotally secured to the front chute means. An alley-way panel is movably secured to the first front section. At least one alley-way door is pivotally connected to the alley-way panel. A first and a second intermediate section is pivotally secured to the first and second front sections, respectively. A first front means is secured to the first front section for elevating the first intermediate section relative to the first front section and for holding the first intermediate section in an elevated posture relative to the first front section. Similarly, a second front means is secured to the second front section for elevating the second intermediate section relative to the second front section and for holding the second intermediate section in an elevated posture relative to the second front section. The portable, foldable corral preferably additionally comprises a first and second rear section respectively pivotally secured to the first and second intermediate section. A first intermediate means is secured to the first intermediate section for elevating the first rear section relative to the first intermediate section and for holding the first rear section in an elevated posture relative to the first intermediate section. Furthermore, a second intermediate means is preferably secured to the second intermediate section for elevating the second rear section relative to the second intermediate section and for holding the second rear section in an elevated posture relative to the second intermediate section. The first and second front section each preferably comprise a means for changing and positioning a direction of travel of a front wheel. Each of the first and second front sections is supported by a front wheel, and the means for changing and positioning a direction of travel of the front wheel, changes in position each of the front wheels that support the first and second front section.

The present invention further accomplishes its desired objects by broadly providing a method for confining and directing the movement of livestock and the like. The method preferably comprises the steps of:

(a) providing a front chute means to furnish an exit and entrance for livestock and the like;
(b) securing pivotally a first front section to the front chute means;
(c) securing movably an alley-way panel to the first front section;
(d) securing pivotally a second front section to the front chute means;
(e) securing pivotally a first intermediate section to the first front section;
(f) securing pivotally a second intermediate section to the second front section;
(g) confining livestock within the first and second sections and within the first and second intermediate sections; and
(h) directing the movement of livestock between the alley-way panel and the first front section and then through the front chute means.

It is therefore an object of the present invention to provide an improved portable, foldable corral for defining and directing the movement of livestock and the like.

It is another object of the present invention to provide an improved method for confining and directing the movement of livestock.

These, together with the various ancillary objects and features which will become apparent to those skilled in the art as the following description proceeds, are attained by this novel improved portable collapsible corral and method, a preferred embodiment as shown with reference to the accompanying drawings, by way of example only, wherein;

BRIEF DESCRIPTION OF THE DRAWINGS

FIG. 1 is a side elevational view of the corral in a folded position and being towed by a vehicle;

FIG. 2 is a front elevational view of the corral in a folded position;

FIG. 3 is a rear elevational view of the corral in a folded position and being towed;

FIG. 4 is a segmented side elevational view of one side of the corral in an unfolded position;

FIG. 6 is a front elevational view of the corral in an unfolded position;

FIG. 7 is a partial top plan view of the wheel supporting one of the front sections having been set for the position for unfolding a folded corral;

FIG. 8 is a partial perspective view of the handle residing in a notch of a bracket and representing the position for the wheel supporting one of the front sections to be in the solid line representation in FIG. 7;

FIG. 9 is a partial vertical sectional view of a wheel which supports one of the front sections and where the wheel is in a towing position;

FIG. 10 is a partial vertical sectional view taken in direction of the arrows and along the plane of line 10—10 in FIG. 9;

FIG. 11 is a partial vertical sectional view of one of the front sections connecting to one of the intermediate sections;

FIG. 14 is a top plan view of the rear sections having been pivoted against their respective contiguous intermediate sections, which are the initial steps for folding the unfolded corral of FIG. 12;

FIG. 15 is a top plan view of the corral being folded after the respective combined intermediate sections/rear sections have been pivoted against their respective contiguous front sections;

FIG. 16 is a top plan view of the corral after the folded corral in FIG. 15 has been pulled a distance to allow the respective combined front sections/intermediate sections/rear sections to converge inwardly to trail immediately behind the front chute means;

FIG. 17 is a partial front elevational view of one of the front sections having an auxiliary gate pivoted thereto;

FIG. 18 is a partial perspective view of a lateral brace pivoted against one of the intermediate sections;

FIG. 19 is a partial perspective view of one of the upper hinges which secures the upper part of the auxiliary gate to one of the front sections;

FIG. 20 is a partial perspective view of the lever means which is employed to raise and lower one of the contiguous sections of the corral;

FIG. 21 is a partial perspective view of the lever means mounted to an intermediate section engaged to a rear stanchion of one of the rear sections in order to elevate the rear end of said rear section;

FIG. 22 is a partial perspective view of a lever means mounted on one of the front sections engaged to and holding in an elevated position a contiguous intermediate section;

FIG. 23 is a partial front elevational view of the chain of a lever bar being engaged within a recess of an ear of a rear stanchion of one of the intermediate sections;

FIG. 27 is a side elevational view of the alley-way panel pivotally secured to the support members and pivoted essentially flushed against a front section of the improved corral;

FIG. 28 is a top plan view of the front section of the improved corral in FIG. 27 with the alley-way panel pivotally secured against the front section;

FIG. 29 is a segmented top plan view of the alley-way panel pivoted away from the front section;

FIG. 30 is a segmented top plan view of the alley-way panel collapsed against the front section of the improved corral;

FIG. 31 is a partial perspective view of the alley-way panel pivoted away from the front section including the alley-way door pivotally connected to the alley-way panel;

FIG. 32 is a front elevational view of the alley-way door;

FIG. 32A is a partial front elevational view of the askewed members showing an aperture in the bottom thereof;

FIG. 32B is a partial view of the handle bound to a sleeve rotatable on a shaft;

FIG. 33 is partial vertical sectional view taken in direction of the arrows and along the plane of line 33—33 in FIG. 32;

FIG. 38 is a partial perspective view of the alley-way panel disposed away from the front section; and FIG. 39 is another partial perspective view of the alley-way panel swung away from the front section with the intermediate support member holding the alley-way panel in a spaced relationship with respect to the front section.

DETAILED DESCRIPTION OF THE INVENTION

Figure 5:
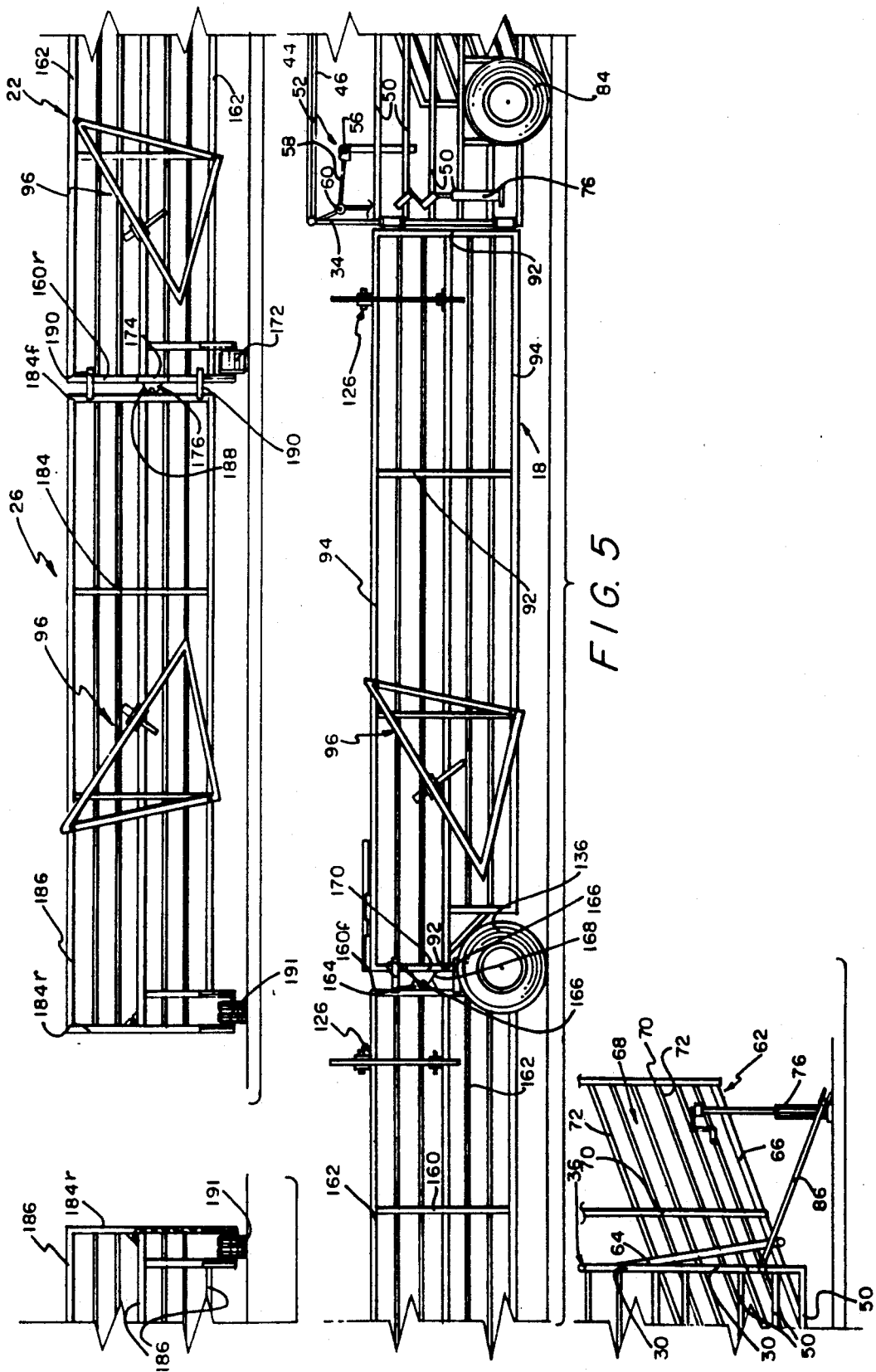
FIG. 5 is a side elevational view of the other side of the corral in an unfolded position.

Referring in detail now to the drawings, wherein similar parts of the invention are identified by like reference numerals, there is seen the portable, foldable corral, generally illustrated as 10, which is primarily used for confining and directing the movement of livestock and the like.

Figure 12:
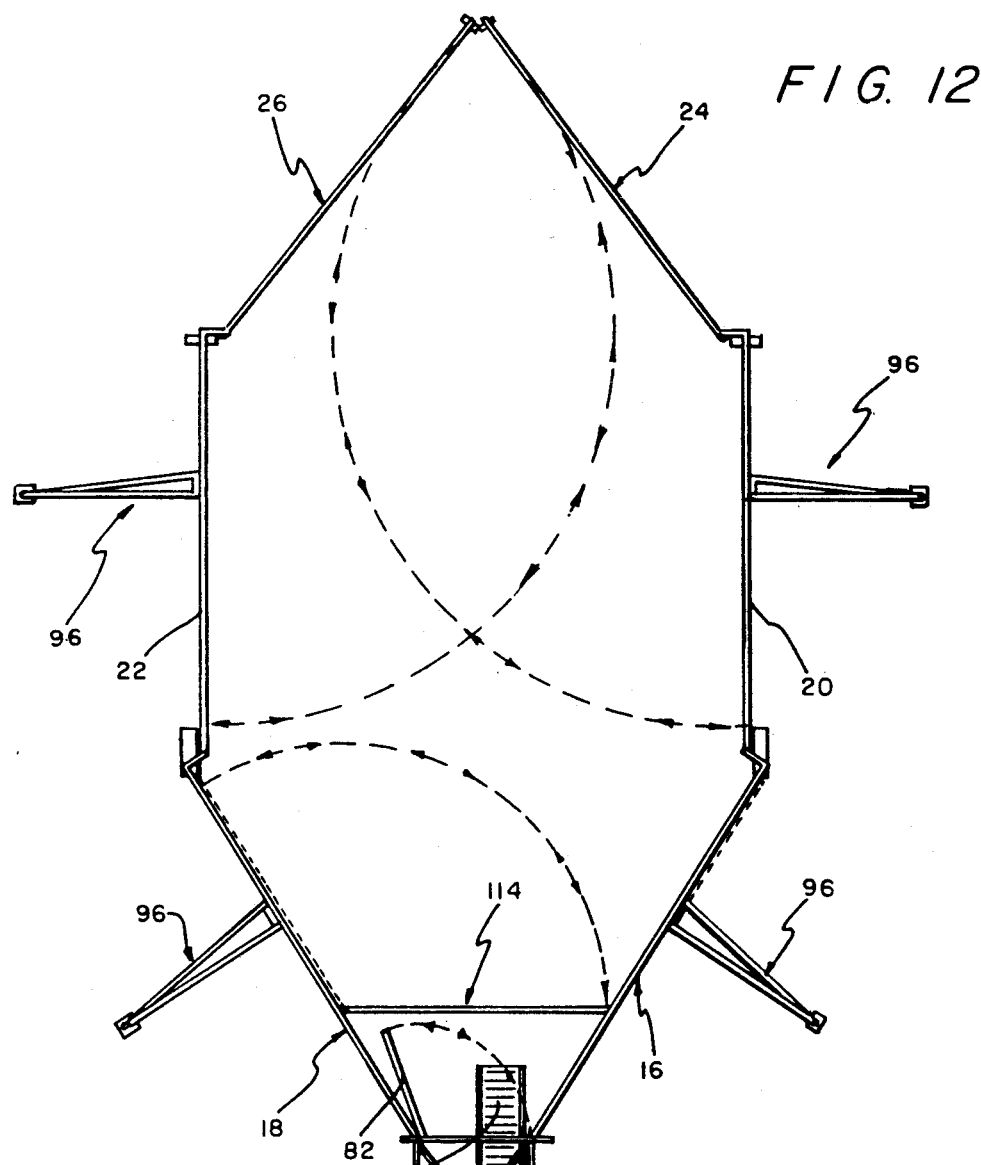
FIG. 12 is a top plan view of the corral in an unfolded posture.

The corral 10 comprises a front chute means, generally illustrated as 12, for providing an exit and entrance for livestock and the like. Pivotally secured to the front chute means 12 is a tongue means, generally illustrated as 14. As best illustrated in FIG. 12, also pivotally secured to opposed sides of the front chute means 12 is a pair of front sections, generally illustrated as 16 and 18. Intermediate sections, generally illustrated as 20 and 22, respectivly pivotally connect to front sections 16 and 18. The corral 10 is provided with a pair of rear sections, generally illustrated as 24 and 26, which respectively pivotally attach to intermediate sections 20 and 22. FIG. 12 illustrates the corral 10 in an unfolded position. FIGS. 1, 2, 3 and 16 depict the folded positions (i.e., a towing position) for the corral 10 with each rear section 24 and 26 folded against and secured to its respective intermediate section 20 and 22; and with the combined rear sections/intermediate sections folded against and secured to the front sections 16 and 18 (also see FIGS. 14 and 15).

The front chute means 12 has a pair of front upright supports 28 and 30 and a pair of rear upright supports 32 and 34. A front brace, generally illustrated as 36, connects to and is supported by the front upright supports 28 and 30. Similarly, a rear brace, generally illustrated as 38, attaches to and is supported by the rear upright sections 32 and 34. As best shown in FIGS. 2 and 3, front brace 36 has a front beam 40 and rear brace 38 has a rear beam 42. Top support bars 44 and 46 criss-cross each other and interconnect the front beam 40 with the rear beam 42. A series of spaced horizontally disposed bars 48 interconnects the front upright support 28 with the rear upright support 32. Similarly, a series of spaced horizontally disposed bars 50 interconnects the front upright support 30 with the rear upright support 34. A hoist means, generally illustrated as 52, is secured to the horizontal bars 48. The hoist means 52 includes a hand crank 54 for turning a spool 56 having a line 58 that passes through a pulley 60 (see FIGS. 1 and 4) mounted to rear beam 42. Pivotally connected to the front beam 40 is a ramp means, generally illustrated as 62, in FIGS. 4 and 5. Ramp means 62 comprises a pair of ramp supports 64—64 which pivotally connect to the front beam 40. The ramp means 62 additionally comprises a platform 66 whereto the ramp supports 64—64 pivotally connect on opposed sides thereof. Removably connected to the platform 66 is a chute 68 consisting of vertical chute supports 70 that slidably, removably mount to the platform 66 and chute horizontal supports 72 which connect to the vertical chute supports 70. Also removably secured to the front end of the platform 66 is a pair of jacks 76—76 which function to support the ramp means 62 due to the weight of the livestock passing on platform 66. The chute 68 is removable from the platform 66 and may be readily transported with the corral 10, such as in pickup truck 74. The jacks 76—76 are readily removably mounted to the bars 48 and/or bars 50, as shown in FIGS. 1 and 5. After the chute 68 and the jacks 76—76 have been removed, the ramp supports 64—64 may be pivoted backwardly and upwardly to elevate the platform 66 to the posture of FIGS. 1, 2 and 3. A safety chain 78 is preferably connected to rear beam 42 and is passed underneath the elevated platform 66 to insure that the platform 66 remains in the elevated position. The front chute means 12 also further comprises a pair of front chute gates 80—80, a rear chute gate 82, and a pair of chute wheels 84—84. As shown in FIG. 1, one of the front chute gates 80 pivotally connects to front upright support 28, while the other front chute gate 80 pivotally connects to front upright support 30. When closed, the front chute gates 80—80 are in a touching relationship with respect to each other. The rear gate 82 pivotally connects to rear upright support 34 and opens as illustrated in FIG. 12. FIG. 12 also shows the opening relationship of the front chute gates 80—80. The pair of chute wheels 84—84 rotatably connect to a chute axle 84 for supporting the front chute means 12 off the ground and for facilitating the towing of the front chute means 12 by a vehicle, such as pickup truck 74.

As previously indicated, tongue means 14 is pivotally secured to the front chute means 12. More specifically, tongue means 14 comprises a pair of tongue bars 86—86, one of which pivotally connects to front upright support 28 while the other tongue bar 86 pivotally attaches to the other front upright support 30. Pivotally connected to an end of one of the tongue bars 86 is a lug or hatch means 88 which removably secures to the pickup truck 74 for towing purposes. The tongue bar 86 not having pivotally connected at its end the lug or hitch means 88, removably and pivotally attaches to the lug or hitch means 88 such as to be readily separable therefrom. Before gates 80—80 can be opened, one tongue bar 86 is separated from the lug or hitch means 88, and subsequently both tongue bars 86—86 (including the one having the lug or hitch means 88) are moved pivotally away from each other, as best shown in FIG. 12. To prevent an inadvertent separation of the tongue bars 86—86, a tongue safety bar 90 (see FIGS. 1 and 12) is removably connected to each of the tongue bars 86—86. Obviously, before the tongue bars 86—86 can be separated, the tongue safety bar 90 has to be removed off of at least one of the tongue bars 86—86. It is further obvious that in order to be able to lower the platform 66 from its elevated position to the lower position of FIGS. 4 and 5 where the chute 68 and the jacks 76—76 can be removably secured thereto, the front chute gates 80—80 and the rear chute gate 82 are to be opened. Before the gates 80—80 and 82 can be closed, the chute 68 and jacks 76—76 are removed from the platform 66, and the platform 66 is subsequently pivoted into its elevated position of FIGS. 1, 2 and 3.

Figure 13:
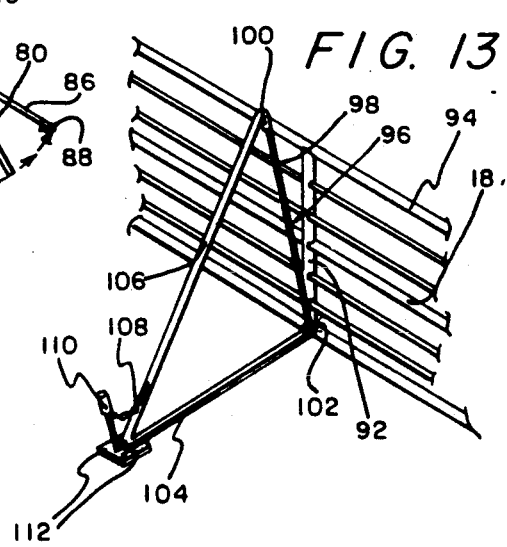
FIG. 13 is a partial perspective view of a lateral brace supporting one of the front sections.

As was previously mentioned, the front sections 16 and 18 are pivotally connected to the front chute means 12, more specifically to the rear upright supports 32 and 34 respectively. Each front section 16 and 18 has a plurality of spaced vertical front stanchions 92 having connected therewith a plurality a spaced horizontal front bar 94. Pivotally secured to each of the front sections 16 and 18 (more specifically to at least one of the front bars 94 or one of the front bars 94 and a vertical stanchion 92) is a lateral brace means, generally illustrated as 96. As best illustrated in FIGS. 13 and 18, the lateral brace means 96 comprises a back leg 98 pivotally secured to horizontal bar 94 and vertical stanchion 92 at 100 and 102, respectively, a base leg 104 connected and exending away from the back leg 98, and an hypotenuse leg 106 interconnecting the top end of the back leg 98 with an outermost end of the base leg 104. Connecting to the leg 106 via chain 108 is a stake 110. A brace lug 111 is secured to a horizontal bar for removably holding the hypotenuse leg 106 and to retain the lateral brace means 96 against the horizontal bars 94 of sections 16 and 18. A brace plate 112 is mounted underneath the outermost end of the base leg 104 and includes an aperture (not shown) wherethrough the stake 110 can slidably pass to firmly brace and affix the front sections 16 and 18 in a desired location. As best shown in FIG. 17, the front section 18 additionally includes an auxiliary gate 114 comprising an auxiliary post 116 having secured thereto hinges 118—118 for slidably engaging hooks 120—120 (see FIG. 19) mounted to plates 122 which have been connected to a pair of contiguous horizontal bars 94—94. As best illustrated in FIGS. 12 and 14, auxiliary gate 114 is capable of being swung away from section 118 to a touching relationship with section 16 to prevent corraled livestock from passing into and/or through the front chute means 12.

Each of the sections 16 and 18 has mounted to one of the horizontal bars 94 thereof, a lever means, generally illustrated as 126, for elevating intermediate sections 20 or 22 relative to section 16 or 18 and for holding the intermediate sections 20 or 22 in an elevated posture relative to front section 16 or 18, all of which will be more specifically explained below. As will be seen and also explained below is that each of the intermediate sections 20 and 22 also have the lever means 126 for elevation rear sections 24 and 26 relative to intermediate sections 20 and 22 and for holding the rear sections 24 or 26 in an elevated posutre relative to intermediate section 20 or 22. As best illustrated in FIGS. 20-22, lever means 126 comprises a lever bar 128 pivotally connected to and in a bifurcated lever lug 130. As best seen in FIG. 22, one of the horizontal bars 94 has bound thereto a lever securing lug means 132 for firmly holding the lower part of the lever bar 128 such that the lever bar 128 is in an upright position while lodging against a plurality of the horizontal bars 94. FIG. 21 illustrates the lever means on one of the intermediate sections 20 or 22 being engaged to and in the process of raising one of the rear sections 24 and 26. At the top end of the lever bar 128 is a chain 134 which is for releasably engaging an end (more specifically a top end as will be explained in greater detail below) of the intermediate section 20 or 22 (or of the rear section 24 or 26 if the lever means 126 is being operated on the intermediate section 20 or 22) such that as the lever bar 128 is pivoted downwardly in direction of the arrow A in FIG. 21, the end of the intermediate section 20 or 22 (or of the rear section 24 or 26 if the lever means 126 is being operated on the intermediate section 20 or 22) travels upwardly in direction of the arrow B in FIG. 21. When lever bar 128 is pivoted all the way down and into the lever securing lug means 132 for being firmly held therein, the end of the intermediate section 20 or 22 (or if the rear section 24 or 26 of the lever means 126 is being operated on the intermediate section 20 or 22) remains locked in an elevated position off of the ground, as best shown in FIG. 22.

Each of the front sections 16 and 18 is supported at an extreme end by a wheel 136. As best shown in FIGS. 9, 10 and 11, one of the extreme vertical stanchions 92 of each section 16 and 18 has a pair of spacer bars 138—138 connected thereto and extending outwardly therefrom. Bound to the spacer bars 138—138 is a sleeve 140. Rotatably passing through the sleeve 140 is a shaft 142 having an axle 144 bound at one end thereto and a handle 146 (also see FIGS. 7 and 8) connected to the other end thereof. Rotatably secured to the axle 144 is the wheel 136. When the handle 146 is moved, shaft 142 also moves which moves and rotatably pivots the wheel 136. Secured to an end of the uppermost horizontal bar 94 of each of the front sections 16 and 18 is a bracket 148 (see FIGS. 8 for best view) having recesses 150 and 152. Recesses 150 and 152 are for receiving the handle 146 as shown in FIG. 8. The combination of the handle 146 (and its associated required members, such as sleeve 140 and shaft 142, etc.) and the bracket 148 with recesses 150 and 152 represent a means for changing and positioning a direction of travel of the wheels 136—136, which in turn changes and positions the direction of travel of front sections 16 and 18, including the respective pivotally secured intermediate sections 20 and 22/rear sections 24 and 26. When handle 146 is in recess 150, wheel 136 is in the dotted line position in FIG. 7 where the wheel 136 is generally aligned with the horizontal bars 94 of the front sections 16 and 18. When the wheel 136 is in the dotted line position in FIG. 7, the wheel 136 is in the towing position of FIGS. 1 and 16. When handle 146 is in recess 152, the wheel 136 is in the solid line position in FIG. 7 and is in the position for unfolding the corral 10. More specifically, the towing position for the corral 10, as previously indicated, is the solid line position in FIG. 16. In the event that it is desired to open the folded corral 10 to the dotted line position in FIG. 16 to set the corral 10 in an initially posture to be unfolded, the handle 146 on each of the front sections 16 and 18 is removed from recess 150 and is subsequently disposed in recess 152 as shown in FIG. 8. As was previously mentioned, such disposition of the handle 146 rotates the wheel 136 to the solid line position in FIG. 7, and is the dotted position of wheels 136—136 labeled on and over the solid position of the wheels 136—136 in FIG. 16. After the wheel 136 in each of the front sections 16 and 18 has been positioned as such, as the folded corral 10 is pulled forward by the pickup truck 74, the front sections 16 and 18 (including the respective pivotally connected intermediate sections 20 and 22 and rear sections 24 and 26) start pivotally flanging or moving outwardly in direction of the arrows C—C in FIG. 16. In this position, as will be explained in greater detail hereinafter, the intermediate sections 20 and 22 and the rear sections 24 and 26 can be folded away from the front sections 16 and 18 to the solid line positions in FIG. 12. Similarly, in the event that it is desired to fully close the corral 10 after the intermediate sections 20 and 22 and the rear sections 24 and 26 have been secured against the front sections 16 and 18 as will be explained in greater detail below, the handle 146 on each of the front sections 16 and 18 is removed from recess 152 and is subsequently disposed in recess 150. As indicated, such position of the handle 146 disposes the wheel 136 to the position shown in FIG. 9 (i.e., the position where wheel 136 is aligned with horizontal bar 94), and is the dotted line position of the wheels 136—136 in FIG. 16, seen in the dotted line representation of front sections 16, 18, intermediate sections 20, 22, and rear sections 24, 26 folded together and against each other. After the wheel 136 in each of the front sections 16 and 18 has been moved and positioned as such and referencing FIG. 16, as the corral 10 is pulled forward by the truck 74, the front sections 16 and 18 (including the respective pivotally secured intermediate sections 20 and 22/rear sections 24 and 26) start converging toward each other in direction of the arrows D—D in FIG. 16 and/or from the dotted line position to the solid line representation.

As was indicated above, intermediate sections 20 and 22 respectively secure to the front sections 16 and 18. Each intermediate section 20 and 22 has a plurality of spaced vertical intermediate stanchions 160 with 160r and 160f respectively representing the rearmost intermediate stanchion and the forwardmost intermediate stanchion. A plurality of spaced horizontal intermediate bars 162 is connected to the intermediate stanchion 160. The lateral brace means 96 is pivotally secured to one bar 162 and to one of the vertical stanchions 160. As best shown in FIG. 11, a front intermediate hinge member 164 is bound to the intermediate stanchion 160f. Also bound to the intermediate stanchion 160f is a pair of guides 166—166 wherethrough sleeve 140 (including shaft 142) pivotally, slidably pass to allow for both horizontal pivotation and vertical pivotation of the intermediate section 20 and/or 22 about sleeve 140 of the front section 16 and/or 18. To further allow for both horizontal pivotation and vertical pivotation of the intermediate section 20 and/or 22 about sleeve 140 of the front section 16 and/or 18, the front intermediate hinge member 164 pivotally secures to hinge member 168 which is integrally bound to an outside sleeve 170 which rotatably passes around sleeve 140. When the rear end (i.e., the end containing stanchion 160r) of intermediate section 20 or 22 is raised and held by the lever means 126 mounted to front section 16 and 18, the front end (i.e., the end containing stanchion 160f and represented in FIG. 11) pivots to the dotted line representation in FIG. 11. The intermediate hinge member 164 pivots vertically about hinge member 168 to the dotted line representation of the hinge member 164 as further seen in FIG. 11. Furthermore the two guides 166—166 as well as bars 162 and stanchion 160f pivot vertically to the dotted line position as also further seen in FIG. 11. As was previously indicated, each of the intermediate sections 20 and 22 have a lever means 126. With respect to intermediate sections 20 and 22, the lever means 126 mounts to the intermediate horizontal means 162; more specifically, lever lug 130 is bound to the top intermediate horizontal bar 162, and lug means 132 is connected to one of the lower intermediate horizontal bars 162 spaced at a lower position from the top horizontal bar 162. The rear end containing rear stanchion 160r of each of the intermediate sections 20 and 22 is supported by a wheel 172 that rotates to facilitate the movement of the intermediate sections 20 and 22 when the same are moved wheels 172—172 are typically not for towing purposes but function to permit manual movement of intermediate sections 20 and 22. The rear stanchion 160r further includes a sleeve 174 (see FIG. 4) rotatably secured therearound, and a bracket 176 is integrally bound to sleeve 174. The sleeve 174-bracket 176 combination as illustrated in FIG. 22 is identical to the sleeve 170-bracket 168 combination of the front sections 16 and 18 clearly depicted in FIG. 11. As best shown in FIGS. 22 and 23, each rear stanchion 160r of the intermediate sections 20 and 22 is formed at its uppermost part with an ear 180 having a recess 182 wherethrough chain 132 is jammed or steadfastly lodged such as to permit the lever bar 128 (on the front sections 16 and 18) upon being pivoted downwardly to lift the rear end of the intermediate section 20 and/or 22 and hold the same above the ground. Such a posture elevates each of the wheels 172—172 off the ground. It should be noted, as will be further explained below, that before the lever means 126 on each of the front sections 16 and 18 can function to elevate the rear end of the intermediate sections 20 and 22, the rear sections 24 and 26 have to pivot against their respective contiguous intermediate section 20 or 22 and the rear ends of rear sections 24 and 26 have to be raised and held off the ground by the lever means 126 mounted on each of the intermediate sections 20 and 22 (see FIGS. 14 and 21).

Each rear section 24 and 26 has a plurality of spaced vertical rear stanchions 184 with 184r and 184f respectively representing the rearmost rear stanchion and the forwardmost rear stanchion. A series of spaced horizontal rear bars 186 is connected to the rear stanchions 184. Optionally, the lateral brace means 96 is pivotally secured to one bar 186 and to one of the vertical stanchions 184. The uppermost part of each stanchion 184r (see FIG. 21) of each rear section 24 and 26 is formed with an ear 187 having a recess 189 (both comparable to ear 180 and recess 182 on each of the rear stanchions 160r) wherethrough the chain 134 of the lever means 126 mounted on the intermediate sections 20 and 22 is steadfastly lodged to permit the lever bar 128 upon being pivoted downwardly as best shown in FIG. 21 to lift the rear end of the rear section 24 and/or 26 and hold the same above and off the ground. The rear end containing stanchion 184r of each rear section 24 and 26 is supported by a wheel 191. As best illustrated in FIG. 4 and FIG. 22, a rear hinge member 188 is integrally connected to stanchion 184f. Further bound to stanchion 184f is a pair of guides 190—190 wherethrough stanchion 160r pivotally, slidably pass to allow for both horizontal pivotation of the front end of the rear sections 24 and 26 about each stanchion 160r of the intemediate sections 20 and 22. The rear hinge member 188 pivotally connects to the bracket 176 to provide an additional allowance for both horizontal pivotation and vertical pivotation of the front end (including stanchion 184f) of the rear sections 24 and 26 about each stanchion 160r of the intermediate sections 20 and 22. The combination of the hinges 176 and 188 and the guides 190 and 190 function identical to the hinges 164 and 168 and guides 166 and 166 as illustrated in FIG. 11. More specifically, when the rear ends (i.e., the end containing stanchion 184r) of rear sections 24 and 26 are raised and held through chain 134 of the lever means 126 (mounted on the intermediate sections 20 and 22) passing through recess 189 to the ear 187 formed at the top of each stanchion 184r, the front end (i.e., the end containing stanchion 184f) pivots similarly to the front end (i.e., the end containing stanchion 160f and represented in FIG. 11) of the intermediate sections 20 and 22. More specifically, hinge member 188 pivots to a comparable dotted line position of hinge 164 in FIG. 11. More specifically further, guides 190 and 190 pivot to a comparable dotted line position of guides 166—166 in FIG. 11 and bars 186 and stanchion 184f would pivot to a comparable dotted line position of bars 162 and stanchion 160f also in FIG. 11. When the rear ends of the rear sections 24 and 26 have been elevated and held by the lever means 126 which are secured on the intermediate sections 20 and 22, each of the wheels 191—191 are off the ground. Wheels 191—191 are comparable to wheels 172—172 in that they are not for towing but function merely to facilitate the manual movement of the rear sections 24 and 26. It is to be noted that before the lever means 126 on each of the intermediate sections 20 and 22 can function to elevate the rear ends of the rear sections 24 and 26, the rear sections 24 and 26 have to swing and pivot against their respective contiguous intermediate sections 20 or 22 as best shown in FIG. 14. The stanchions 184r have a safety chain 200 that engages both stanchions 184r-184r of the rear sections 24 and 26 as a safety precaution while the corral 10 is being towed (see FIG. 3).

Referring in detail now to FIGS. 24–36 for the improved corral comprising the portable, foldable corral 10 having an alley-way, generally illustrated as 300, pivotally secured to front section 16. While the alley-way 300 is being illustrated as pivotally secured to front section 16, it is to be understood that the alley-way 300 may be pivotally secured to any of the other sections 18, 20, 22, 24 or 26. The alley-way 300 broadly comprises an alley-way panel, generally illustrated as 302; one or more support members, each generally illustrated as 304, pivotally coupling the alley-way panel 302 to the front section 16; an alley-way door, generally illustrated as 306, pivotally secured to the alley-way panel 302; and a rear alley-way door, generally illustrated as 308, also pivotally secured to the alley-way panel 302.

The alley-way panel 302 comprises a plurality of spaced vertical alley stanchions 310, and a plurality of spaced horizontal alley bars 312 connected to the stanchions 310. The alley-way panel 302 may additionally include a plurality of intermediate alley stanchions 314 secured to three of the spaced horizontal alley bars 312c-312d-312e intermediately to an upper extreme horizontal alley bar 312a and a lower extreme horizontal alley bar 312b. Preferably, there are three (3) alley stanchions: a front stanchion 310a; an intermediate stanchion 310b; and a rear stanchion 310c. The rear alley-way door 308 is pivotally secured to the rear stanchion 310c and the alley-way door 306 (or head door) is pivotally secured to the front stanchion 310a.

Figure 26:
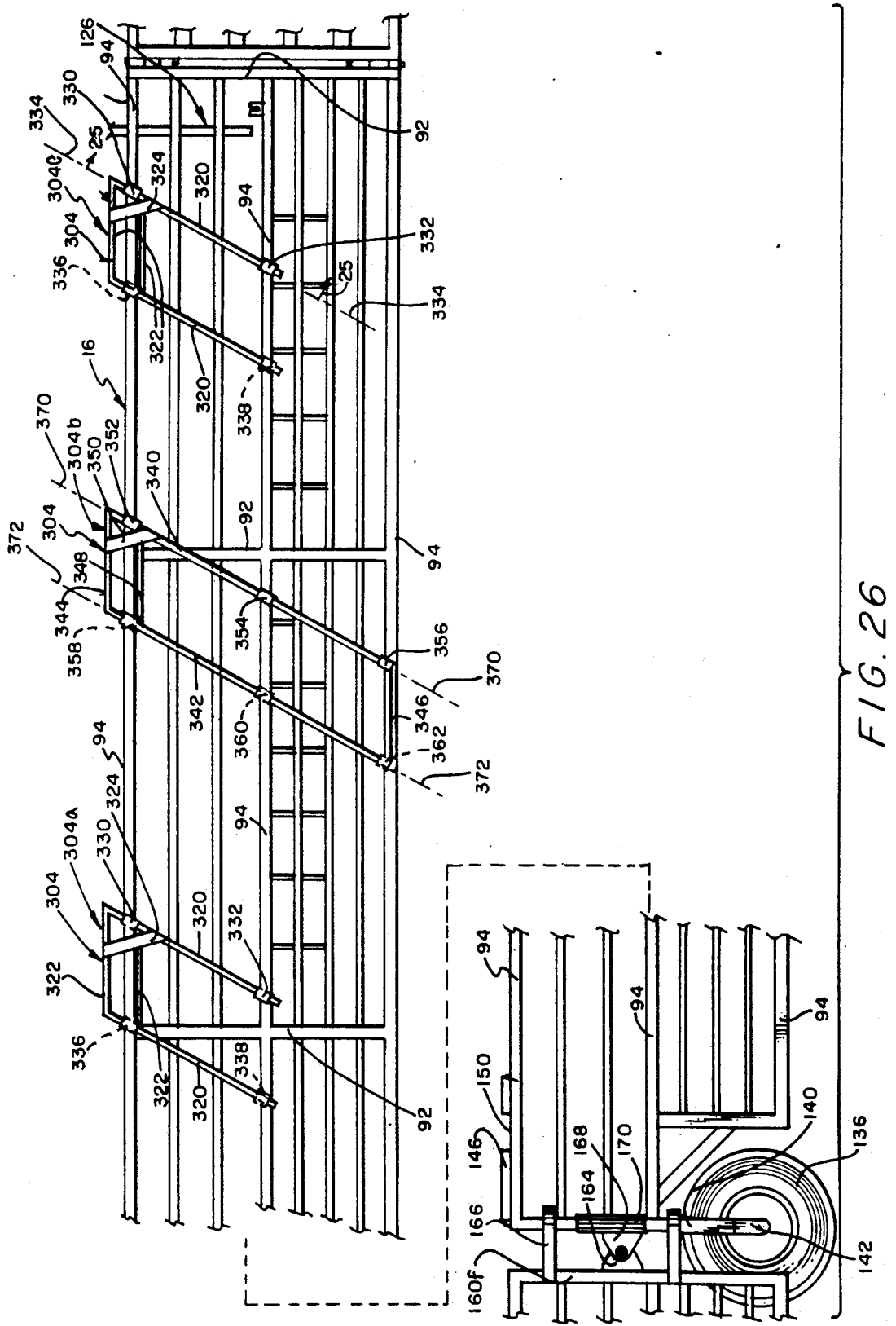
FIG. 26 is a partial segmented side elevational view of a front section of the improved corral with the support members pivotally connected to the front section, and with the alley-way panel removed from pivotal connection with the support members.
Figure 34:
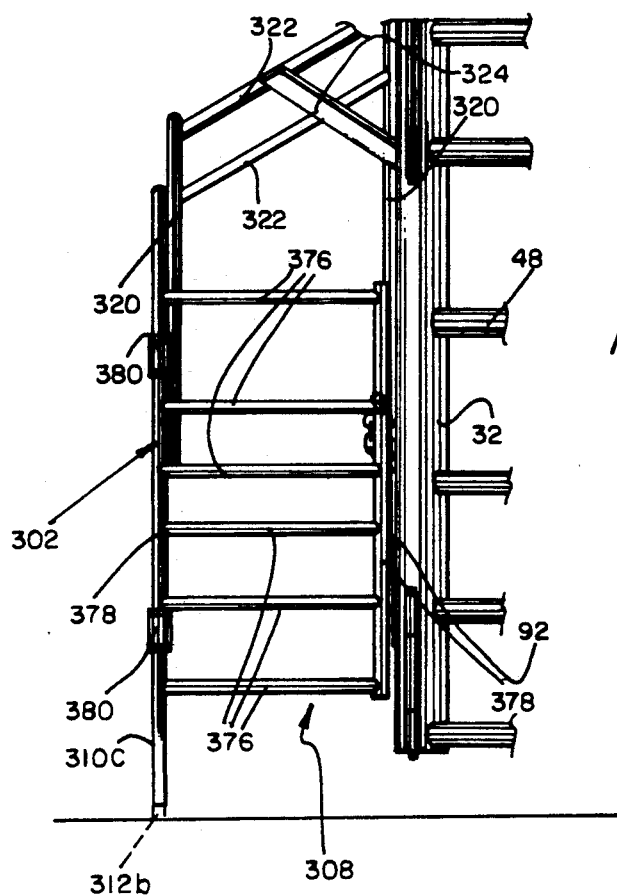
FIG. 34 is a partial front elevational view of the alley-way rear door pivotally secured to the alley-way panel.
Figure 35:
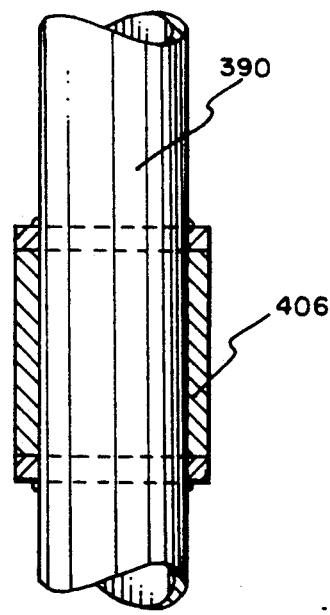
FIG. 35 is a partial vertical sectional view of a sleeve used to hinge the head door to the alley-way panel.
Figure 36:
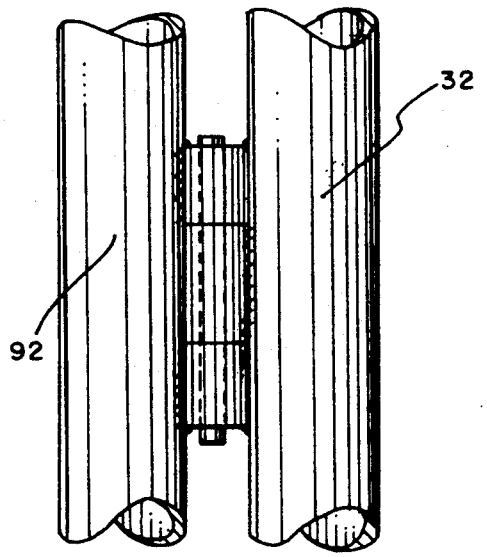
FIG. 36 is a front elevational view of a hinged joint employed for pivotally securing the front stanchion of the front section to the rear upper supports of the chute means.

The one or more support members 304 preferably comprises a front support member 304a, an intermediate support member 304b, and a rear support member 304c. The front and rear support members 304a and 304c are identical, and are trilateral in configuration having a pair of generally parallel sides 320—320 and a pair of tops 322—322. A support brace 324 interconnects one side 320 with the panel tops 322—322. The front and rear support members 304a and 304c also include an upper cylindrical sleeve 330 secured to an upper extreme horizontal bar 94 and a lower cylindrical sleeve 33 secured to the fourth horizontal bar 94 as best shown in FIG. 26. One of the sides 320 rotatably passes through the sleeves 330 and 332 (see FIG. 25). The front and rear support members 304a and 304c also include an upper cylindrical sleeve 336 secured to the upper extreme horizontal alley bar 312a and a lower cylindrical sleeve 338 secured to the horizontal alley bar 312e. The other side 320 of the support member 304 rotatably passes through the sleeves 336 and 338. The upper and lower cylindrical sleeves 330 and 332 have an axis 334 which forms an acute angle with the horizontal bars 94. Similarly, the upper and lower cylindrical sleeves 336 and 338 have an axis 335 which forms an acute angle with alley bars 312a and 312e. Such angular disposition of the sleeves 330, 332, 336 and 338 causes the alley-way panel 302 to drop down to a grid when swung away from the front section 16 (see FIG. 34). More specifically, such angular disposition of the sleeves 330, 332, 336 and 338 causes the tops 322 of the front and rear support members 304a and 304b to project downwardly when the alley-way panel 302 is swung away from the front section 16. When the alley-way panel 302 is pivoted or swung flushed against the front section 16, the tops 322—322 of the support members 304(a) and 304(c) are generally parallel With the horizontal bars 94. As the alley-way panel 302 is being swung away from the front section 16, the tops 322-322 leave their parallel disposition with respect to the horizontal bars 94 and commence a downwardly travel projection until the disposition of FIG. 34 is reached. As best shown in FIG. 34, when the alley-way panel 302 is swung all the way out, the lower extreme horizontal alley bar 312b touches or is in close proximity to the grid.

The intermediate support member 304b is a parallelogram or quadrilateral having a first pair of parallel sides 340 and 342 and a second pair of parallel sides 344 and 346. The intermediate support member 304b also includes a lower top member 348 secured to and interconnecting sides 340 and 342. A brace member 350 connects to lower top member 348 and also connects to side 344 and to side 340. Side 346 is important for keeping the alley-way panel 302 spaced when swung away from the first front section 16 at a desired distance from the first front section 16. The intermediate support member 304b also includes an upper cylindrical sleeve 352 secured to the upper extreme horizontal bar 94, an intermediate cylindrical sleeve 354 secured to the fourth horizontal bar 94 and a lower cylindrical sleeve 356 secured to the lower extreme horizontal bar 94 (as best shown in FIG. 26). Side 340 rotatably passes through sleeves 352, 354 and 356. The intermediate support member 304b also comprises an upper cylindrical sleeve 358 secured to the upper extreme horizontal alley bar 312a, an intermediate cylindrical sleeve 360 secured to the horizontal alley bar 312d, and a lower cylindrical sleeve 362 secured to the horizontal alley bar 312b. Side 342 rotatably passes through sleeves 358, 360 and 362. The sleeves 352, 354 and 356 have an axis 370 which forms an acute angle with the horizontal bars 94. Similarly, the sleeves 358, 360, and 362 have an axis 372 which forms an acute angle with alley bars 312a, 312d and 312b. Such angular disposition of the sleeves 352, 354, 356, 358, 360 and 362 causes the alley-way panel 302 to drop down to a grid when swung away from the front section (see FIG. 39). More particularly, such angular disposition of the sleeves 352, 354, 356, 358, 360 and 362 causes the side 344, the lower top member 348, and the side 346 to project downwardly from or off of the front section 16 when the alley-way panel 302 is swung away from the front section 16 (see FIG. 39). When the alley-way panel 302 is pivoted or swung flushed against the front section 16, the sides 344 and 346 and the lower top member 348 of the support member 304b are generally parallel with the horizontal bars 94 (as best shown in FIG. 26). As the alley-way panel 302 is being swung away (i.e. from left to right in the top plan view of FIG. 28) from the front section 16, the sides 344 and 346 and the lower top member 348 leave their respective parallel dispositions with respect to the horizontal bars 94 and commence a downwardly travel projection from the front section 16 until the disposition of FIG. 39 is obtained. As best shown in FIG. 39, when the alley-way panel 302 is swung all the way out, the lower extreme horizontal alley bar 312b touches or is in close proximity to the grid. As previously indicated, the side 346 assists in the alley-way panel 302 maintaining a desired distance from the front section 16.

The rear alley-way door 308 comprises a plurality of horizontal members 376 interconnected to a pair of vertical members 378. One of the members 378 is secured to the alley-way panel 302, more specifically to rear stanchion 310c, via a pair of hinges 380—380.

Figure 37:
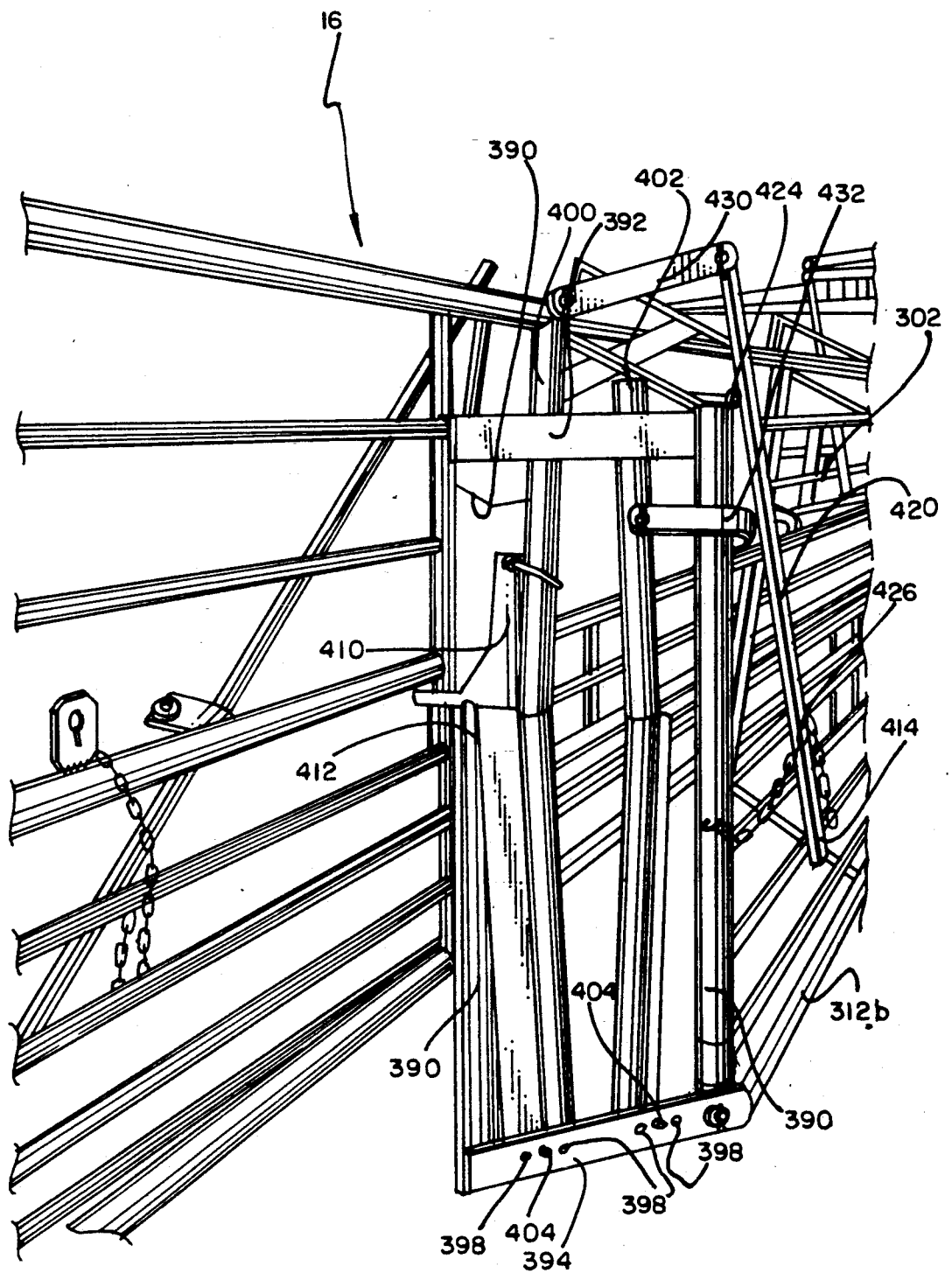
FIG. 37 is a perspective view of the head door in a partial open position.

The head door 306 comprises a pair of vertical door stanchions 390—390 and an upper pair of spaced horizontal door bars 392—392 secured on opposed top sides of the two vertical door stanchions 390—390. The head door 306 also incudes a lower pair of spaced horizontal door bars 394—394 secured on opposed bottom sides of the two vertical door stanchions 390—390. Each door bar 394 has a plurality of first apertures 396 and a plurality of second apertures 398. The apertures 396 of one bar 394 aligns or collimates with the aperture 396 of the other bar 394. Similarly, the apertures 398 of one bar 394 aligns or collimates with the apertures 398 of the other bar 394. A pair of askewed vertical members 400, 402 are removably disposed between the upper pair of bars 392—392 and between the lower pair of bars 394—394. The vertical members 400 and 402 are generally centrally skewed at 400a and 402a respectively. A livestock head extends and is held between the askewed vertical members 400 and 402 for branding or vaccination purposes or for any other desired purposes. As best shown in FIG. 32A, the lower part of vertical members 400 and 402 have an aperture 400b and 402b respectively wherethrough a bolt 404 passes for pivotally securing the askewed member 400 to and between any pair of aligned opposed apertures 396 on lower spaced bars 394 and 394 and for further pivotally securing the askewed member 402 to and between any pair of aligned opposed apertures 398 on lower spaced bars 394 and 394. The distance between askewed vertical members 400 and 402 may be set or regulated by moving the bolt(s) 404 out of aperture 400b and one pair of opposed spaced apertures 396 and/or out of aperture 402b and one pair of opposed spaced apertures 398, and slidably passing the bolt(s) 404 through another pair of opposed spaced apertures 396 and aperture 400b and/or through another pair of opposed spaced apertures 398 and aperture 402b. The extreme right door stanchion 390 in FIG. 32 has a pair of sleeves 406—406 rotatably secured thereto and bound to the alley-way front stanchion 310a such that the head door 306 can pivot back and forth thereon. The extreme left door stanchion 39 in FIG. 32 has an L-shaped latch 410 pivotally secured thereto and biased normally downwardly by a spring 412. The latch 410 is for releasably securing the head door 306 to the front section 16 as shown in FIG. 31. A chain 414 connects to the right door stanchion 390. The head door 306 has a handle 420 coupled to askewed vertical members 400 and 402 and bound to a sleeve 422 (see FIG. 32B) that rotates on a shaft 424 which is secured to one or both bars 392 and protrudes off of the extreme front bar 392. The handle 420 includes a hook 426 for engaging the chain 414 as best shown in FIG. 37. Coupling of the handle 420 to the two askewed vertical members 400 and 402 is conveniently accomplished by an upper link 430 pivotally secured to the top of the vertical member 400 and to the top of the handle 420 and a lower link 432 pivotally secured to an upper part of the vertical member 402 and to an intermediate part of the handle 420 as best shown in FIG. 32. Moving pivotally the handle 420 up or away from the right stanchion 390 spreads the two vertical askewed members 400 and 402, and moving pivotally the handle 420 downwardly or towards the right stanchion 390 causes the two members 400 and 402 to approach each other and close the distance therebetween.

Figure 24:
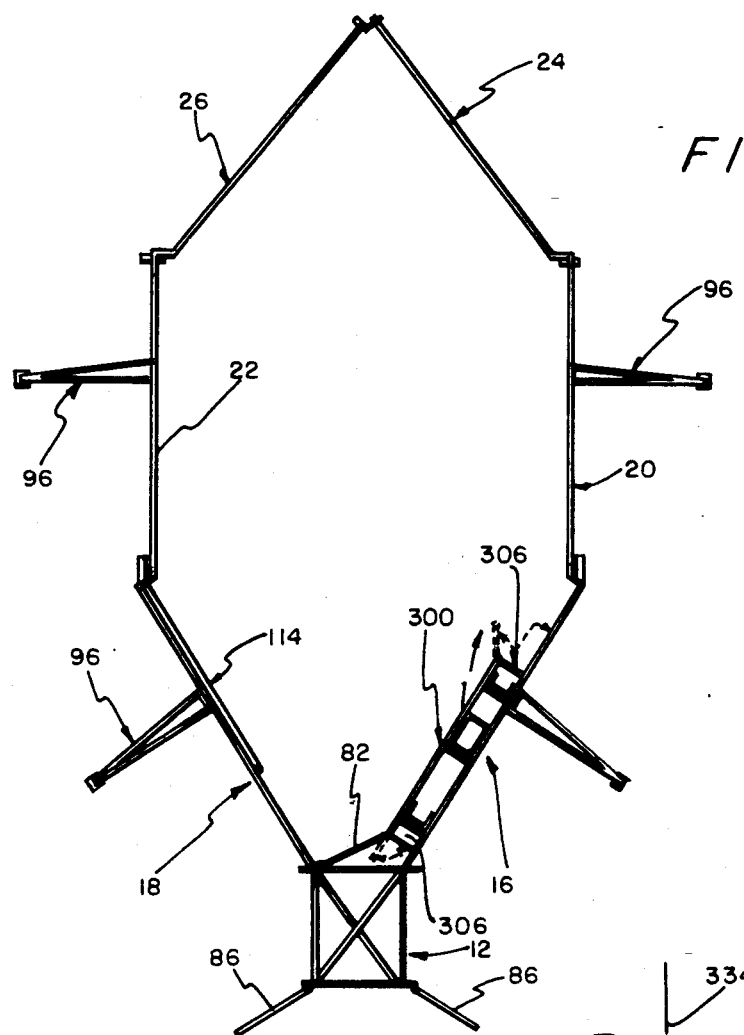
FIG. 24 is a top plan view of the improved corral having an alley-way panel movably secured to a front section.
Figure 25:
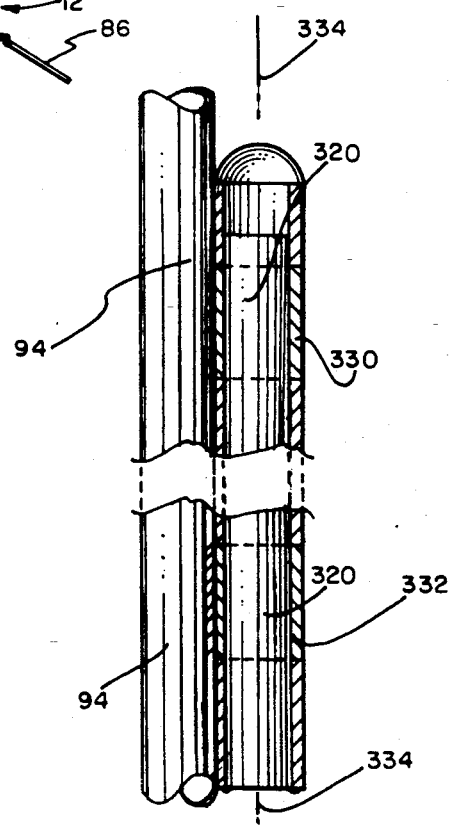
FIG. 25 is a partial vertical sectional view taken in direction of the arrows and along the plane of line 25—25 in FIG. 26.

With continuing reference to the drawings, particularly to FIGS. 24-39, for operation of the alley-way 300, livestock and the like may be channeled through the alley-way 300 from the chute 12 by opening the rear gate 82 and securing releasably the same to rear stanchion 310c (see FIG. 24). Rear door 306 is opened and pivoted against the rear gate 82 (see FIG. 24 again) such that the livestock can enter the space between the alley-way panel 302 and the front section 16. The head door 306 has been latched to the front section 16 via latch 410. The livestock is driven forward until the head of the first livestock animal is between the askewed members 400 and 402, and the handle 420 is driven downwardly to clamp and firmly hold the head of the first livestock animal between the askewed points 400a and 402a. The chain 414 is engaged to hook 426 to prevent the animal's head from becoming disengaged. The first livestock animal may then be conveniently vaccinated or branded, or otherwise treated. Subsequently, after the first animal has been treated, the chain 414 is released from hook 426 and the handle 420 is elevated to disengage head of the first livestock animal from between the askewed members 400 and 402. The latch 410 is release from engagement with the front section 16 and the head door 306 is opened to release the first animal. The process is repeated with subsequent animals. After all animals have been treated, the head door 306 is opened to an aligned position with the alley-way panel 302, and the rear door 308 is likewise opened to an aligned position with the alley-way panel 302 as best shown in the dotted line representation in FIG. 28. After alignment, the alley-way panel 302 is swung from right to left with respect to the top plan view in FIG. 28. As the alley-way panel 302 is being swung, the support members 304a, 304b and 304c start elevating the alley-way panel 302 in accordance with the previously mentioned reasons and procedures. More particularly, the sleeves 352, 354, and 356, due to their acute disposition on the respective horizontal bars 94, and the sleeves 330 and 332, due to their likewise acute disposition on the respective horizontal bars 94 respectively cause the support member 304b and the two support members 304a and 304b to elevate the alley-way panel 302 as it approaches the front section. The alley-way panel 302 may be moved by any suitable means, such as with a bar 500 (see FIG. 38) being releasably slidably engaged to the front section 16 and the alley-way panel 302 as shown in FIG. 38. Continuing to reference FIG. 38, when an end of the bar 500 is pulled towards the head door 306, the bar 500 acts as a lever and the resulting leverage causes the panel 302 to move from right to left. After the alley-way panel 302 (and the head door 306 and rear door 306) are flushed against the front section 16, the alley-way panel 302 may be held there by any suitable means, such as with a safety chain (not shown) that interconnects the front section 16 with the alley-way panel 302. When it is desired to release the alley-way panel 302 off of the front section 16, the safety chain (not shown) is disengaged from the alley-way panel 302 and the process is reversed. The bar 500 may be used as a lever after being disposed as shown in FIG. 38 by way of example only, and when the bar 500 is pushed towards the rear door 308, the alley-way panel 302 starts pivotally moving away from the front section 16 and dropping down until the lower extreme horizontal alley bar 312b is on the grid. Obviously, the alley-way 300 can not be disposed in an operating posture until the intermediate section 20 and the rear section 24 have been pivoted away in accordance with the procedure previously mentioned and as will be further mentioned hereafter. Obviously further, the intermediate section 20 and the rear section 24 can not be positioned in the travelling position of FIGS. 1, 2, and 3 until after the alley-way 300 has been disposed flushed against the front section 16; which is the travelling position for the alley-way 300. When the alley-way 300, more particularly the alley-way panel 302, is flushed against the front section 16, the lever means 126 on the front section 16 is operable for its desired purpose(s).

With continuing reference to the drawings for operation of the invention and the method for confining and directing the movement of livestock, the folded corral 10 is unfolded by initially removing safety chain 200 from around one of the rear stanchions 184r. After the safety chain 200 has been removed, the wheels 136—136 are pivoted to the position illustrated by solid lines in FIG. 7, by elevating the handle 146, removing the handle from recess 150 of bracket 148, and subsequently lodging the handle 146 into recess 152. As was previously indicated above, such movement of the handle causes the wheel to take the position of FIG. 7 which is for unfolding the corral 10. After each wheel 136 of the front sections 16 and 18 has been set to the sold line position of FIG. 7, the pickup truck 74 is pulled forward a certain predetermined distance to permit the combined front sections/intermediate sections/rear sections to flange and divert or move outwardly in direction of the arrows C—C in FIG. 16 to the dotted line representation in FIG. 16. Subsequently, the lever means 126 on each of the front sections 16 and 18 is released from the respective engagement of the ears 180 of the rear stanchions 160r of each of the intermediate sections 20 and 22. More specifically, lever bar 128 is moved away from lug means 132 by pivoting the lever bar 128 upwardly and away from the horizontal bars 94 of the front sections 16 and 18. Such pivotation of the lever bar 128 causes rear stanchion 16r of the intermediate sections 20 and 22 to be lowered such that the wheels 172—172 touch the ground. The lever bar 128 of each of the lever means mounted on the first and front sections 16 and 18, is elevated upward far enough such that the chain 134 may be readily removed from the recess 182 of the respective ear 180 of the rear stanchions 16r of the intermediate sections 20 and 22. After the chain 134 has been removed from the recesses 182 of both stanchions 16r—16r of the intermediate sections 20 and 22, the combined intermediate sections 20 and 22/ rear sections 24 and 26 may be easily, manually rolled away from the respective contiguous front sections 16 and 18. After the combined respective intermediate sections 20 and 22/rear sections 24 and 26/ have been pivoted away from their respective contiguous front sections 16 and 18, the lever means 126 on each of the intermediate sections 20 and 22 is disengaged from each of the rear stanchions 184r of the rear ends of the rear sections 24 and 26. The procedure for such disengagement is comparable to the procedure of disengaging the lever means 126 (on each of the front sections 16 and 18) from the rear stanchions 16r—16r of the intermediate sections 20 and 22. More particularly, the lever bar 128 is elevated away from the horizontal bars 162 such that the rear ends (containing the rear stanchions 184r) of the rear sections 24 and 26 is lowered towards the ground until the wheels 191 of each of the rear sections 24 and 26 contacts the ground. Subsequently, the chain is removed from within each of the recesses 189 of each ear 187 of each of the rear stanchions 184r of the rear sections 24 and 26. Thereafter, the rear sections 24 and 26 may be easily rolled away from their respective contiguous intermediate section 20 or 22 such that the corral has the unfolded position of FIG. 12. Obviously, the unfolding of the corral 10 could take place simultaneously with confining the livestock within the confines of the rear sections 24 and 26/intermediate sections 20 and 22/front sections 16 and 18 or such confining could take place after completing the unfolding procedure. Subsequently, the auxiliary gate 114 may be pivoted to the position indicated in FIG. 12 in order to prepare the chute 68 of the chute means 12 for exiting any confined livestock behind the auxiliary gate 114.

The chute means 12 may be easily prepared for exiting livestock by merely separating the pair of tongue sections 86—86 as indicated above, swinging outwardly front gates 80—80 to the posture depicted in FIG. 12; and swinging rear gate 82 outwardly and away from the structure of the chute means 12 in order to facilitate the pivoting of the platform 66 of the ramp means 62 downwardly. The chute 68 may be engaged to the platform 66. As previously indicated above, the jacks 76—76 may be disposed on opposed sides of the platform 66 to support the weight of the livestock as the livestock move over the top of platform 66. After the chute means 12 has been prepared to move livestock out of the unfolded corral as depicted in FIG. 12, auxiliary gate 114 is swung backwardly and against the front section 18 to open up the movement of the livestock over the slanted ramp platform 66. The slanted platform 66 may terminate at the entrance of a cattle car, train, or the like which will be employed to transport the livestock. The lateral braces 96 are preferably pivoted downwardly as illustrated in FIG. 13 in order to support the particular section that the particular lateral brace 96 is engaged to.

After all of the livestock has been removed from within the confines of the unfolded corral 10, the corral may be folded back to its folded position by reversing the foregoing order. More specifically, initially, the lateral braces 96 are disengaged from the ground and pivoted against the respective section that pivotally engages the respective lateral brace 96. Subsequently, the chute means 12 is prepared for the towing position of FIG. 1 by initially removing the chute 68 off of the platform 66, and removing the jacks 76—76 from the platform 66. The chute 68 may be stored in the back of the pickup truck 74, and the jacks 76—76 are connected to the horizontal bars 48 or 50 of the chute means 12. The hoist means 52 may be employed to help elevate the platform 66 by extending the line 58 downwardly to engage the end of the platform and cranking the handle 54 such that the platform 66 begins to travel upwardly and backwardly to its elevated position as depicted in FIG. 1. After the platform 66 has reached its elevated position, the chain 78 may be engaged underneath the platform 66 as a safety precaution for towing. The front gates 80—80 are subsequently closed, as well as rear gate 82. The tongue sections 86—86 are brought together and are engaged within the hitch or lug 88. Safety bar 90 is preferably placed across the tongue sections 86—86 as a safety precaution. Subsequently to preparing the chute means 12 for being towed, the rear sections 24 and 26 are swung forward in direction of the arrows in FIG. 12 such that the respective rear sections 24 and 26 are in a touching relationship with their contiguous intermediate sections 20 and 22. The respective lever means 126 on each of the intermediate sections 20 and 22 are employed to elevate the rear ends of the rear sections 24 and 26 off of the ground, as best depicted in FIG. 21. After the lever means 126 on each of the intermediate sections 20 and 22 have elevated rear sections 24 and 26 off of the ground, the combined intermediate sections 20 and 22/rear sections 24 and 26 are swung in direction of the arrows in FIG. 14 such that the respective combined intermediate sections 20 and 26/rear sections 22 and 24 are placed in a touching relationship with their respective contiguous front sections 16 and 18. Such a disposition is clearly depicted in FIG. 15. Thereafter, the lever means 126 on each of the front sections 16 and 18 are employed to engage the ears 180 of the rear stanchions 160r of the rear of the intermediate sections 20 and 22 in order to elevate the rear ends (including wheels 172) off of the ground and to hold the rear ends of the intermediate sections 20 and 22 in an elevated position such that the wheels 172 do not touch the ground. Such a disposition of elevating and holding an intermediate section 20 or 22 (including a held and elevated rear section 24 or 26) is clearly depicted in FIG. 22. After the lever means 126 on each of the front sections 16 and 18 have engaged and are locked in place within lug means 132 to hold and elevate the intermediate sections 20 and 22 above the ground, the wheels 136 on each of the front sections 16 and 18 are pivoted to the dotted line representation in FIG. 7 by lifting the handle 146 from within recess 152 and removing the handle to recess 150. Such dotted line representation of wheel 136 in FIG. 7 is the towing position for the corral 10. After the wheels 136 on each of the front sections 16 and 18 have been set and disposed as such, the pickup truck is started and moved forward slowly which causes the combined front sections 16 and 18/ intermediate sections 20 and 22/rear sections 24 and 26 to converge in direction of the arrows D—D in FIG. 16, i.e., from the dotted line position to the solid line position in FIG. 16. After all of the combined sections have converged to the solid line position in FIG. 16, the safety chain 200 is employed to hold together as a safety precaution the rear of the folded corral 10.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A portable, foldable corral for confining and directing the movement of livestock and the like comprising a chute means for providing an exit and entrance for livestock;

a front section having a front end and a rear end, said front end being pivotally connected to said chute means;

an intermediate section having an intermediate front end and an intermediate rear end, said intermediate front end being pivotally connected to said rear end of said front section;

an elevating means secured to said front section for elevating the intermediate rear end of the intermediate section relative to the front section and for holding the intermediate rear end of the intermediate section in an elevated posture relative to the front section; and an alley-way panel movably secured to said front section.

2. The portable foldable corral of claim 1 additionally comprising an alley-way door pivotally secured to said alley-way panel.

3. In a method for assembling a foldable corral wherein a front section is pivotally secured to an intermediate section, the improvement comprising the steps of:

(a) providing a means, secured to the front section, for elevating the intermediate section relative to the front section;

(b) providing an alley-way panel, said alley-way panel being movably secured to said front section such as to be capable of being moved away from said front section to provide an alley where livestock may pass; and (c) elevating the intermediate section relative to the front section.

4. The method of claim 3 additionally comprising providing an alley door pivotally secured to said alley-way panel.

* * * * *